(12) United States Patent
Lyons et al.

(10) Patent No.: US 7,998,571 B2
(45) Date of Patent: Aug. 16, 2011

(54) COMPOSITE CEMENT ARTICLE INCORPORATING A POWDER COATING AND METHODS OF MAKING SAME

(75) Inventors: David Lyons, Point Clare (AU); Theresa Sukkar, Blacktown (AU)

(73) Assignee: James Hardie Technology Limited, Dublin (IE)

( * ) Notice: Subject to any disclaimer, the term of this patent is extended or adjusted under 35 U.S.C. 154(b) by 781 days.

(21) Appl. No.: 11/179,355

(22) Filed: Jul. 11, 2005

(65) Prior Publication Data

US 2006/0024480 A1 Feb. 2, 2006

Related U.S. Application Data

(60) Provisional application No. 60/586,807, filed on Jul. 9, 2004.

(51) Int. Cl.
*B32B 3/26* (2006.01)

(52) U.S. Cl. ............... 428/319.3; 428/319.1; 428/319.7; 428/317.9; 428/312.2; 428/312.4; 428/703

(58) Field of Classification Search ............... 428/312.2, 428/312.4, 319.3, 319.7, 317.9, 703, 319.1
See application file for complete search history.

(56) References Cited

U.S. PATENT DOCUMENTS

| | | |
|---|---|---|
| 369,216 A | 8/1887 | Temple |
| 494,763 A | 4/1893 | Smidth |
| 525,442 A | 9/1894 | Burrows |
| 575,074 A | 1/1897 | Smith |
| 774,114 A | 11/1904 | Spear |
| 815,801 A | 3/1906 | Depew et al. |
| 1,344,181 A | 6/1920 | Mason |
| 1,399,023 A | 12/1921 | Murray |
| 1,510,497 A | 10/1924 | Keller |
| 1,512,084 A | 10/1924 | Church |
| 1,571,048 A | 1/1926 | Garrow |
| 1,630,801 A | 5/1927 | Parsons |
| 1,634,809 A | 7/1927 | Weiss |
| 1,698,557 A | 1/1929 | O'Brien |

(Continued)

FOREIGN PATENT DOCUMENTS

AR 151553 10/1966

(Continued)

OTHER PUBLICATIONS

English Abstract of JP 2002212494, Kurosawa et al, Jul. 31, 2002, 4 pages.*

(Continued)

*Primary Examiner* — Hai Vo
(74) *Attorney, Agent, or Firm* — Mark D. Fox

(57) ABSTRACT

A cementitious composite article incorporating a powder coating on at least one surface is provided. The composite article includes a surface treatment adapted to facilitate application of the powder coating onto the article. The surface treatment can include modifications to surface porosity, surface, and/or application of a sealer to the surface so as to make the cementitious surface more conducive to powder coating. One method of manufacturing the cementitious composite article includes first applying a sealer coating to a surface of a fiber cement substrate, partially curing the substrate to a gel-like state, applying a powder coating to the article, processing the article to a curing device in which the powder coating and sealer coating are co-cured to form a hardened film.

1 Claim, 3 Drawing Sheets

U.S. PATENT DOCUMENTS

| | | |
|---|---|---|
| 1,819,093 A | 8/1931 | Hardinge |
| 1,856,932 A | 5/1932 | Shaw |
| 1,856,936 A | 5/1932 | Turner |
| 1,871,843 A | 8/1932 | Encson |
| 1,914,163 A | 6/1933 | Randall |
| 1,930,024 A | 10/1933 | Varden |
| 1,943,663 A | 1/1934 | Ericson |
| 1,959,519 A | 5/1934 | Black |
| 1,976,684 A | 10/1934 | Munroe et al. |
| 1,976,984 A | 10/1934 | Condon et al. |
| 1,978,519 A | 10/1934 | Willock et al. |
| 1,995,393 A | 3/1935 | Manske |
| 1,997,939 A | 4/1935 | Loucks |
| 2,009,619 A | 7/1935 | Huffine |
| 2,024,689 A | 12/1935 | Walter et al. |
| 2,030,383 A | 2/1936 | Luth et al. |
| 2,054,854 A | 9/1936 | Dreyfus |
| 2,062,149 A | 11/1936 | Stark et al. |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,182,372 A | 12/1939 | Cox et al. |
| 2,224,351 A | 12/1940 | Kaye |
| 2,253,753 A | 8/1941 | Black |
| 2,276,170 A | 3/1942 | Elmendorf |
| 2,317,634 A | 4/1943 | Olsen |
| 2,320,702 A | 6/1943 | Marchese et al. |
| 2,323,230 A | 6/1943 | McAvoy |
| 2,324,325 A | 7/1943 | Schuh |
| 2,354,639 A | 7/1944 | Seymour |
| 2,377,484 A | 6/1945 | Elmendorf |
| 2,400,357 A | 5/1946 | Krajci |
| 2,413,794 A | 1/1947 | Small |
| 2,447,275 A | 8/1948 | Price |
| 2,511,083 A | 6/1950 | Small |
| 2,517,122 A | 8/1950 | Lockwood |
| 2,518,281 A | 8/1950 | Camp et al. |
| 2,619,776 A | 12/1952 | Potters |
| 2,624,298 A | 1/1953 | Farren |
| 2,645,576 A | 7/1953 | Bate et al. |
| 2,676,892 A | 4/1954 | McLaughlin |
| 2,694,025 A | 11/1954 | Slayter et al. |
| 2,724,872 A | 11/1955 | Herbes |
| 2,746,735 A | 5/1956 | Bradford |
| 2,762,619 A | 9/1956 | Booth |
| 2,782,018 A | 2/1957 | Bradford |
| 2,782,463 A | 2/1957 | Bergvall et al. |
| 2,797,201 A | 6/1957 | Veatch |
| 2,838,881 A | 6/1958 | Plumat |
| 2,879,171 A | 3/1959 | Kullenberg |
| 2,880,101 A | 3/1959 | Ulfstedt |
| 2,928,143 A | 3/1960 | Newton |
| 2,945,326 A | 7/1960 | Wood |
| 2,947,115 A | 8/1960 | Wood |
| 2,978,339 A | 4/1961 | Veatch et al. |
| 2,978,340 A | 4/1961 | Veatch et al. |
| 2,987,408 A | 6/1961 | Minnick |
| 2,997,403 A | 8/1961 | Searight |
| 3,010,177 A | 11/1961 | Thompson et al. |
| 3,046,700 A | 7/1962 | Davenport |
| 3,047,985 A | 8/1962 | Murphy |
| 3,081,179 A | 3/1963 | Charvat et al. |
| 3,106,503 A | 10/1963 | Randall et al. |
| 3,150,947 A | 9/1964 | Bland |
| 3,173,229 A | 3/1965 | Weber |
| 3,181,662 A | 5/1965 | Maerzig, Jr. |
| 3,214,876 A | 11/1965 | Mattes |
| 3,215,505 A | 11/1965 | Schmalfeld et al. |
| 3,235,039 A | 2/1966 | O'Donnell |
| 3,236,932 A | 2/1966 | Grigas et al. |
| 3,256,105 A | 6/1966 | Alford |
| 3,264,125 A | 8/1966 | Bourlin |
| 3,274,743 A | 9/1966 | Blum, Jr. |
| 3,279,905 A | 10/1966 | Wood et al. |
| 3,284,980 A | 11/1966 | Dinkel |
| 3,293,014 A | 12/1966 | Callender et al. |
| 3,297,411 A | 1/1967 | Dear |
| 3,321,414 A | 5/1967 | Vieh |
| 3,333,379 A | 8/1967 | Harns |
| 3,336,710 A | 8/1967 | Raynes |
| 3,341,314 A | 9/1967 | Vukasovich et al. |
| 3,348,956 A | 10/1967 | Ekdahl |
| 3,360,392 A | 12/1967 | Mod et al. |
| 3,365,315 A | 1/1968 | Beck et al. |
| 3,408,786 A | 11/1968 | Snyker |
| 3,415,019 A | 12/1968 | Andersen |
| 3,416,275 A | 12/1968 | Van Loghern et al. |
| 3,421,281 A | 1/1969 | Harris |
| 3,481,093 A | 12/1969 | Davidson |
| 3,496,961 A | 2/1970 | Lange |
| 3,501,324 A | 3/1970 | Kubo |
| 3,527,004 A | 9/1970 | Sorenson |
| 3,560,185 A | 2/1971 | Nylander |
| 3,560,186 A | 2/1971 | Nylander |
| 3,574,113 A | 4/1971 | Shannon |
| 3,582,377 A | 6/1971 | Hays et al. |
| 3,606,720 A | 9/1971 | Cookson |
| 3,616,173 A | 10/1971 | Green et al. |
| 3,625,808 A | 12/1971 | Martin |
| 3,634,567 A | 1/1972 | Yang |
| 3,635,742 A | 1/1972 | Fujimasu et al. |
| 3,660,955 A | 5/1972 | Simon et al. |
| 3,663,341 A | 5/1972 | Veneziale, Jr. |
| 3,663,353 A | 5/1972 | Long et al. |
| 3,679,446 A | 7/1972 | Kubo |
| 3,703,795 A | 11/1972 | Mattes |
| 3,708,943 A | 1/1973 | Thomas et al. |
| 3,716,386 A | 2/1973 | Kempster |
| 3,729,368 A | 4/1973 | Ingham et al. |
| 3,736,162 A | 5/1973 | Chvalovsky et al. |
| 3,748,100 A | 7/1973 | Forseth |
| 3,748,160 A | 7/1973 | Carbajal |
| 3,752,685 A | 8/1973 | Honda et al. |
| 3,753,749 A | 8/1973 | Nutt |
| 3,754,365 A | 8/1973 | Carrick et al. |
| 3,780,483 A | 12/1973 | Mattes |
| 3,782,985 A | 1/1974 | Gebhardt |
| 3,797,179 A | 3/1974 | Jackson |
| 3,797,190 A | 3/1974 | Widdowson |
| 3,804,058 A | 4/1974 | Messenger |
| 3,818,668 A | 6/1974 | Charniga |
| 3,835,604 A | 9/1974 | Hoffmann, Jr. |
| 3,836,412 A | 9/1974 | Boustany et al. |
| 3,838,998 A | 10/1974 | Matthews et al. |
| 3,843,380 A | 10/1974 | Beyn |
| 3,847,633 A | 11/1974 | Race |
| 3,865,779 A | 2/1975 | Oya et al. |
| 3,866,378 A | 2/1975 | Kessler |
| 3,869,295 A | 3/1975 | Bowles et al. |
| 3,873,025 A | 3/1975 | Qvarnstrom et al. |
| 3,873,475 A | 3/1975 | Pechacek et al. |
| 3,877,918 A | 4/1975 | Cerbo |
| 3,887,386 A | 6/1975 | Majumdar et al. |
| 3,888,617 A | 6/1975 | Barnett |
| 3,888,957 A | 6/1975 | Netting |
| 3,902,911 A | 9/1975 | Messenger |
| 3,904,377 A | 9/1975 | Honda et al. |
| 3,904,424 A | 9/1975 | Aoki et al. |
| 3,909,283 A | 9/1975 | Warnke |
| 3,918,981 A | 11/1975 | Long |
| 3,921,346 A | 11/1975 | Sauer et al. |
| 3,924,901 A | 12/1975 | Phillips |
| 3,928,701 A | 12/1975 | Roehner |
| 3,931,069 A | 1/1976 | Lundin |
| 3,932,275 A | 1/1976 | Mewes et al. |
| 3,935,364 A * | 1/1976 | Proksch et al. |
| 3,954,390 A | 5/1976 | Akhundov et al. |
| 3,965,633 A | 6/1976 | Carroll |
| 3,969,567 A | 7/1976 | Occleshaw et al. |
| 3,974,024 A | 8/1976 | Yano et al. |
| 3,986,312 A | 10/1976 | Calhoun et al. |
| 3,992,845 A | 11/1976 | Grzesiek et al. |
| 3,998,651 A | 12/1976 | Baudouin et al. |
| 3,998,944 A | 12/1976 | Long |
| 4,002,482 A | 1/1977 | Coenen et al. |

| | | | | | | |
|---|---|---|---|---|---|---|
| 4,003,752 | A | 1/1977 | Isohata et al. | 4,274,239 | A | 6/1981 | Carroll |
| 4,009,135 | A | 2/1977 | Harreus et al. | 4,274,913 | A | 6/1981 | Kikuiri et al. |
| 4,010,587 | A | 3/1977 | Larsen | 4,292,206 | A | 9/1981 | Barnes, Jr. et al. |
| 4,010,589 | A | 3/1977 | Gross et al. | 4,292,364 | A | 9/1981 | Wesch et al. |
| 4,013,480 | A | 3/1977 | Chumbley et al. | 4,295,907 | A | 10/1981 | Cordts et al. |
| 4,015,392 | A | 4/1977 | Eaton | 4,298,413 | A | 11/1981 | Teare |
| 4,028,859 | A | 6/1977 | Bellagamba et al. | 4,298,647 | A | 11/1981 | Cancio et al. |
| 4,034,528 | A | 7/1977 | Sanders et al. | 4,303,732 | A | 12/1981 | Torobin |
| 4,040,851 | A | 8/1977 | Ziegler | 4,304,604 | A | 12/1981 | Daerr et al. |
| 4,046,548 | A | 9/1977 | Wood et al. | 4,305,758 | A | 12/1981 | Powers et al. |
| 4,047,355 | A | 9/1977 | Knorr | 4,306,911 | A | 12/1981 | Gordon et al. |
| 4,052,220 | A | 10/1977 | Turpin, Jr. | 4,307,142 | A | 12/1981 | Blitstein et al. |
| 4,052,829 | A | 10/1977 | Chapman | 4,307,551 | A | 12/1981 | Crandell |
| 4,057,908 | A | 11/1977 | Mirliss et al. | 4,321,780 | A | 3/1982 | Hooper et al. |
| 4,058,944 | A | 11/1977 | Rieger et al. | 4,327,528 | A | 5/1982 | Fritz |
| 4,059,423 | A | 11/1977 | De Vos et al. | 4,328,145 | A | 5/1982 | Bobrowski et al. |
| 4,063,393 | A | 12/1977 | Toti | 4,330,634 | A | 5/1982 | Rodaway |
| 4,065,899 | A | 1/1978 | Kirkhuff | 4,332,618 | A | 6/1982 | Ballard |
| 4,066,723 | A | 1/1978 | King et al. | 4,336,338 | A | 6/1982 | Downs et al. |
| 4,070,199 | A | 1/1978 | Downing et al. | 4,337,290 | A | 6/1982 | Kelly et al. |
| 4,070,843 | A | 1/1978 | Leggiere et al. | 4,339,289 | A | 7/1982 | Lankard |
| 4,076,884 | A | 2/1978 | Riley et al. | 4,339,489 | A | 7/1982 | Barker et al. |
| 4,079,562 | A | 3/1978 | Englert et al. | 4,340,407 | A | 7/1982 | Anderson et al. |
| 4,088,804 | A | 5/1978 | Cornwell et al. | 4,343,127 | A | 8/1982 | Greve et al. |
| 4,098,701 | A | 7/1978 | Burrill et al. | 4,344,804 | A | 8/1982 | Bijen et al. |
| 4,101,335 | A | 7/1978 | Barrable et al. | 4,347,155 | A | 8/1982 | Jenkins |
| 4,102,106 | A | 7/1978 | Golder et al. | 4,350,567 | A | 9/1982 | Moorehead et al. |
| 4,102,697 | A | 7/1978 | Fukuba et al. | 4,351,867 | A | 9/1982 | Mulvey et al. |
| 4,102,773 | A | 7/1978 | Green et al. | 4,357,271 | A | 11/1982 | Rosenquist |
| 4,104,103 | A | 8/1978 | Tarullo | 4,361,616 | A | 11/1982 | Bomers et al. |
| 4,104,840 | A | 8/1978 | Heintz et al. | 4,362,566 | A | 12/1982 | Hinterwaldner et al. |
| 4,110,507 | A | 8/1978 | Colledge | 4,363,878 | A | 12/1982 | Yamamoto et al. |
| 4,111,713 | A | 9/1978 | Beck | 4,366,657 | A | 1/1983 | Hopman |
| 4,112,647 | A | 9/1978 | Scheid | 4,370,166 | A | 1/1983 | Powers et al. |
| 4,118,236 | A | 10/1978 | Erskine et al. | 4,373,955 | A | 2/1983 | Bouchard et al. |
| 4,128,696 | A | 12/1978 | Goebel et al. | 4,373,957 | A | 2/1983 | Pedersen et al. |
| 4,131,480 | A | 12/1978 | McCurrich et al. | 4,374,672 | A | 2/1983 | Funston et al. |
| 4,131,638 | A | 12/1978 | Whitaker et al. | 4,375,489 | A | 3/1983 | Muszynski |
| 4,132,555 | A | 1/1979 | Barrable et al. | 4,377,977 | A | 3/1983 | Wurster |
| 4,133,854 | A | 1/1979 | Hendricks | 4,379,553 | A | 4/1983 | Kelly |
| 4,133,928 | A | 1/1979 | Riley et al. | 4,379,729 | A | 4/1983 | Cross et al. |
| 4,134,773 | A | 1/1979 | Simeonov et al. | 4,380,564 | A | 4/1983 | Cancio et al. |
| 4,138,313 | A | 2/1979 | Hillstrom et al. | 4,383,960 | A | 5/1983 | Delcoigne et al. |
| 4,144,121 | A | 3/1979 | Otouma et al. | 4,388,257 | A | 6/1983 | Oguri et al. |
| 4,150,517 | A | 4/1979 | Warner, Sr. | 4,392,336 | A | 7/1983 | Ganssle |
| 4,152,878 | A | 5/1979 | Balinski | 4,394,175 | A | 7/1983 | Cheriton et al. |
| 4,153,439 | A | 5/1979 | Tomic et al. | 4,394,346 | A | 7/1983 | Morooka et al. |
| 4,161,389 | A | 7/1979 | Staffin et al. | 4,399,643 | A | 8/1983 | Hafner et al. |
| 4,162,924 | A | 7/1979 | Kubo et al. | 4,403,006 | A | 9/1983 | Bruce et al. |
| 4,166,749 | A | 9/1979 | Sterrett et al. | 4,406,703 | A | 9/1983 | Guthrie et al. |
| 4,177,176 | A | 12/1979 | Burrill et al. | 4,411,723 | A | 10/1983 | Takeuchi |
| 4,183,188 | A | 1/1980 | Goldsby | 4,411,847 | A | 10/1983 | Netting et al. |
| 4,184,906 | A | 1/1980 | Young et al. | 4,420,351 | A | 12/1983 | Lussi et al. |
| 4,187,658 | A | 2/1980 | Reinwall, Jr. | 4,424,261 | A | 1/1984 | Keeling et al. |
| 4,188,231 | A | 2/1980 | Valore | 4,428,775 | A | 1/1984 | Johnson et al. |
| 4,203,788 | A | 5/1980 | Clear | 4,429,214 | A | 1/1984 | Brindley et al. |
| 4,204,644 | A | 5/1980 | Kozuka et al. | 4,430,108 | A | 2/1984 | Hojaji et al. |
| 4,205,992 | A | 6/1980 | Mogensen et al. | 4,441,944 | A | 4/1984 | Massey |
| 4,211,525 | A | 7/1980 | Vetter et al. | 4,442,219 | A | 4/1984 | TenEyck et al. |
| 4,217,335 | A | 8/1980 | Sasaki et al. | 4,448,599 | A | 5/1984 | Mackenzie et al. |
| 4,222,785 | A | 9/1980 | Henderson | 4,450,022 | A | 5/1984 | Galer |
| 4,225,383 | A | 9/1980 | McReynolds | 4,457,785 | A | 7/1984 | Hsu et al. |
| 4,226,841 | A | 10/1980 | Komeya et al. | 4,462,730 | A | 7/1984 | Knohl |
| 4,231,573 | A | 11/1980 | Kelly | 4,462,835 | A | 7/1984 | Car et al. |
| 4,234,344 | A | 11/1980 | Tinsley et al. | 4,463,532 | A | 8/1984 | Faw |
| 4,235,753 | A | 11/1980 | Brown et al. | 4,465,729 | A | 8/1984 | Cancio et al. |
| 4,235,836 | A | 11/1980 | Wassell et al. | 4,475,936 | A | 10/1984 | Aston et al. |
| 4,240,840 | A | 12/1980 | Downing et al. | 4,478,736 | A | 10/1984 | Raba, Jr. et al. |
| 4,243,421 | A | 1/1981 | Kume et al. | 4,486,234 | A | 12/1984 | Herr |
| 4,250,134 | A | 2/1981 | Minnick | 4,487,620 | A | 12/1984 | Neusy et al. |
| 4,252,193 | A | 2/1981 | Powers et al. | 4,495,301 | A | 1/1985 | Sutor |
| 4,256,584 | A | 3/1981 | Lord et al. | 4,497,688 | A | 2/1985 | Schaefer |
| 4,258,090 | A | 3/1981 | Moraru | 4,498,913 | A | * 2/1985 | Tank et al. |
| 4,258,504 | A | 3/1981 | Dunstan, Jr. | 4,501,830 | A | 2/1985 | Miller et al. |
| 4,261,286 | A | 4/1981 | Kupfer et al. | 4,502,256 | A | 3/1985 | Hahn et al. |
| 4,261,754 | A | 4/1981 | Krenchel et al. | 4,504,320 | A | 3/1985 | Rizer et al. |
| 4,265,674 | A | 5/1981 | Debus et al. | 4,504,335 | A | 3/1985 | Galer |
| 4,268,316 | A | 5/1981 | Wills, Jr. | 4,506,486 | A | 3/1985 | Culpepper, Jr. et al. |
| 4,268,317 | A | 5/1981 | Rayl | 4,507,154 | A | 3/1985 | Burge et al. |

| Patent | Date | Inventor |
|---|---|---|
| 4,510,020 A | 4/1985 | Green et al. |
| 4,512,736 A | 4/1985 | Wader et al. |
| 4,514,947 A | 5/1985 | Grail |
| 4,517,375 A | 5/1985 | Schmidt et al. |
| 4,519,777 A | 5/1985 | Akhtyamov et al. |
| 4,528,307 A * | 7/1985 | Fuhr et al. |
| 4,538,530 A | 9/1985 | Whitman |
| 4,540,629 A | 9/1985 | Sands et al. |
| 4,543,159 A | 9/1985 | Johnson et al. |
| 4,548,676 A | 10/1985 | Johnston et al. |
| 4,553,366 A | 11/1985 | Guerin et al. |
| 4,559,894 A | 12/1985 | Thompson |
| 4,574,012 A | 3/1986 | Oguri et al. |
| 4,576,736 A | 3/1986 | Harmuth |
| 4,586,304 A | 5/1986 | Flamand et al. |
| 4,588,443 A | 5/1986 | Bache et al. |
| 4,590,884 A * | 5/1986 | Kreeger et al. |
| 4,592,185 A | 6/1986 | Lynch et al. |
| 4,595,662 A | 6/1986 | Mochida et al. |
| 4,602,962 A | 7/1986 | Fehlmann et al. |
| 4,621,024 A | 11/1986 | Wright |
| 4,623,390 A | 11/1986 | Delmonico |
| 4,624,798 A | 11/1986 | Gindrup et al. |
| 4,626,398 A | 12/1986 | Vetter et al. |
| 4,629,413 A | 12/1986 | Michelson et al. |
| 4,637,860 A | 1/1987 | Harper et al. |
| 4,637,990 A | 1/1987 | Torobin |
| 4,640,715 A | 2/1987 | Heitzmann et al. |
| 4,641,489 A | 2/1987 | Wood |
| 4,642,137 A | 2/1987 | Heitzmann et al. |
| 4,643,753 A | 2/1987 | Braun |
| 4,643,920 A | 2/1987 | McEntee et al. |
| 4,647,505 A | 3/1987 | Blackie et al. |
| 4,647,509 A | 3/1987 | Wallace et al. |
| 4,647,589 A | 3/1987 | Valone |
| 4,652,433 A | 3/1987 | Ashworth et al. |
| 4,652,535 A | 3/1987 | Mackenzie et al. |
| 4,655,979 A | 4/1987 | Nakano et al. |
| 4,657,810 A | 4/1987 | Douden |
| 4,659,386 A | 4/1987 | Nagai et al. |
| 4,659,679 A | 4/1987 | Falk |
| 4,661,137 A | 4/1987 | Garnier et al. |
| 4,661,398 A | 4/1987 | Ellis |
| 4,670,079 A | 6/1987 | Thompson |
| 4,673,659 A | 6/1987 | Wood et al. |
| 4,677,022 A | 6/1987 | Dejaiffe |
| 4,680,059 A | 7/1987 | Cook et al. |
| 4,685,263 A | 8/1987 | Ting |
| 4,687,752 A | 8/1987 | Peters |
| 4,689,084 A | 8/1987 | Ambroise et al. |
| 4,698,942 A | 10/1987 | Swartz |
| 4,721,160 A | 1/1988 | Parcevaux et al. |
| 4,723,505 A * | 2/1988 | Wilson et al. |
| 4,730,398 A | 3/1988 | Stanton |
| 4,737,191 A | 4/1988 | Meynardi et al. |
| 4,738,723 A | 4/1988 | Frizzell et al. |
| 4,746,364 A | 5/1988 | Kawai et al. |
| 4,748,771 A | 6/1988 | Lehnert et al. |
| 4,749,398 A | 6/1988 | Braun |
| 4,751,202 A | 6/1988 | Toussaint et al. |
| 4,751,203 A | 6/1988 | Toussaint et al. |
| 4,752,061 A | 6/1988 | Dalton et al. |
| 4,759,802 A | 7/1988 | Ochi et al. |
| 4,766,113 A | 8/1988 | West et al. |
| 4,767,491 A | 8/1988 | Vittone et al. |
| 4,767,726 A | 8/1988 | Marshall |
| 4,769,189 A | 9/1988 | Douden |
| 4,770,831 A | 9/1988 | Walker et al. |
| 4,772,328 A | 9/1988 | Pfeifer |
| 4,775,505 A | 10/1988 | Kuroda et al. |
| 4,779,313 A | 10/1988 | Gonas |
| 4,780,141 A | 10/1988 | Double et al. |
| 4,784,839 A | 11/1988 | Bachelard et al. |
| 4,789,604 A | 12/1988 | van der Hoeven et al. |
| 4,793,861 A | 12/1988 | Sohm et al. |
| 4,797,161 A | 1/1989 | Kirchmayr et al. |
| 4,803,105 A | 2/1989 | Kretow et al. |
| 4,806,203 A | 2/1989 | Elton |
| 4,808,229 A | 2/1989 | Arhelger et al. |
| 4,811,538 A | 3/1989 | Lehnert et al. |
| 4,816,091 A | 3/1989 | Miller |
| 4,818,289 A | 4/1989 | Mantymaki et al. |
| 4,818,290 A | 4/1989 | Tuovinen et al. |
| 4,818,595 A | 4/1989 | Ellis |
| 4,819,289 A | 4/1989 | Gibbs |
| 4,826,788 A | 5/1989 | Dennert et al. |
| 4,827,621 A | 5/1989 | Borsuk |
| 4,830,989 A | 5/1989 | Trivedi et al. |
| 4,837,069 A | 6/1989 | Bescup et al. |
| 4,840,672 A | 6/1989 | Baes et al. |
| 4,840,688 A | 6/1989 | Vogt et al. |
| 4,841,702 A | 6/1989 | Huettemann |
| 4,841,705 A | 6/1989 | Fuhrer |
| 4,842,649 A | 6/1989 | Heitzmann et al. |
| 4,846,889 A | 7/1989 | Meyer |
| 4,851,203 A | 7/1989 | Bachelard et al. |
| 4,854,101 A | 8/1989 | Champagne |
| 4,858,402 A | 8/1989 | Putz et al. |
| 4,866,896 A | 9/1989 | Shreiner et al. |
| 4,867,931 A | 9/1989 | Cochran, Jr. |
| 4,870,788 A | 10/1989 | Hassan et al. |
| 4,871,380 A * | 10/1989 | Meyers |
| 4,871,495 A | 10/1989 | Helfench et al. |
| 4,876,827 A | 10/1989 | Williams et al. |
| 4,882,302 A | 11/1989 | Horiuchi et al. |
| 4,888,057 A | 12/1989 | Nguyen et al. |
| 4,894,081 A | 1/1990 | Neusy et al. |
| 4,895,598 A | 1/1990 | Hedberg et al. |
| 4,904,292 A | 2/1990 | Neusy et al. |
| 4,904,503 A | 2/1990 | Hilton et al. |
| 4,906,408 A | 3/1990 | Bouniol et al. |
| 4,910,047 A * | 3/1990 | Barnett et al. |
| 4,914,885 A | 4/1990 | Baker et al. |
| 4,915,740 A | 4/1990 | Sakai et al. |
| 4,924,644 A | 5/1990 | Lewis |
| 4,927,696 A | 5/1990 | Berg et al. |
| 4,928,479 A | 5/1990 | Shekleton et al. |
| 4,930,287 A | 6/1990 | Volk et al. |
| 4,933,013 A | 6/1990 | Sakai et al. |
| 4,933,031 A | 6/1990 | Blomberg et al. |
| 4,935,060 A | 6/1990 | Dingsoyr et al. |
| 4,937,210 A | 6/1990 | Jones et al. |
| 4,937,993 A | 7/1990 | Hitchins et al. |
| 4,938,958 A | 7/1990 | Niira et al. |
| 4,944,842 A | 7/1990 | Stromberg et al. |
| 4,946,505 A | 8/1990 | Jungk et al. |
| 4,946,811 A | 8/1990 | Tuovinen et al. |
| 4,952,631 A | 8/1990 | McAlpin et al. |
| 4,955,169 A | 9/1990 | Shisko et al. |
| 4,963,430 A | 10/1990 | Kish et al. |
| 4,969,250 A | 11/1990 | Hickman et al. |
| 4,969,302 A | 11/1990 | Coggan et al. |
| 4,971,658 A | 11/1990 | Henrickson et al. |
| 4,975,396 A | 12/1990 | Thiery et al. |
| 4,981,666 A | 1/1991 | Yamada et al. |
| 4,981,740 A | 1/1991 | Larsen et al. |
| 4,983,550 A | 1/1991 | Goetz et al. |
| 4,985,119 A | 1/1991 | Vinson et al. |
| 4,994,113 A | 2/1991 | Helmstetter |
| 4,995,605 A | 2/1991 | Conville |
| 4,999,056 A | 3/1991 | Rasmussen et al. |
| 5,002,696 A | 3/1991 | White |
| 5,009,713 A | 4/1991 | Sakuta et al. |
| 5,017,232 A | 5/1991 | Miceli |
| 5,018,909 A * | 5/1991 | Crum et al. |
| 5,021,093 A | 6/1991 | Beshay |
| 5,022,207 A | 6/1991 | Hartnett |
| 5,022,897 A | 6/1991 | Balcar et al. |
| 5,029,425 A | 7/1991 | Bogataj |
| 5,030,287 A | 7/1991 | Magnani et al. |
| 5,030,289 A | 7/1991 | Sattler et al. |
| 5,032,548 A | 7/1991 | Lowe |
| 5,035,920 A | 7/1991 | Smrt et al. |
| 5,045,378 A | 9/1991 | Libby |
| 5,047,086 A | 9/1991 | Hayakawa et al. |
| 5,049,196 A | 9/1991 | Ries |
| 5,063,260 A | 11/1991 | Chen et al. |
| 5,064,784 A | 11/1991 | Saito et al. |

| Patent | Date | Inventor |
|---|---|---|
| 5,067,675 A | 11/1991 | Brant et al. |
| D322,678 S | 12/1991 | Brathwaite et al. |
| 5,069,702 A | 12/1991 | Block et al. |
| 5,073,197 A | 12/1991 | Majumdar et al. |
| 5,076,986 A | 12/1991 | Delvaux et al. |
| 5,077,241 A | 12/1991 | Moh et al. |
| 5,077,952 A | 1/1992 | Moore |
| 5,080,022 A | 1/1992 | Carlson |
| 5,096,858 A | 3/1992 | Das Chaklader et al. |
| 5,099,923 A | 3/1992 | Aften et al. |
| 5,102,596 A | 4/1992 | Lempfer et al. |
| 5,106,557 A | 4/1992 | Rirsch et al. |
| 5,108,510 A | 4/1992 | Burge et al. |
| 5,108,679 A | 4/1992 | Rirsch et al. |
| 5,112,405 A | 5/1992 | Sanchez |
| 5,114,617 A | 5/1992 | Smetana et al. |
| 5,115,621 A | 5/1992 | Kobayashi et al. |
| 5,117,600 A | 6/1992 | Yerushalmi et al. |
| 5,117,770 A | 6/1992 | Hassinen et al. |
| 5,118,225 A | 6/1992 | Koch et al. |
| 5,128,114 A | 7/1992 | Schwartz |
| 5,143,534 A | 9/1992 | Kilner et al. |
| 5,143,780 A | 9/1992 | Balassa |
| 5,154,596 A | 10/1992 | Schwartz et al. |
| 5,154,771 A | 10/1992 | Wada et al. |
| 5,155,958 A | 10/1992 | Huff |
| 5,162,060 A | 11/1992 | Bredow et al. |
| 5,164,003 A | 11/1992 | Bosco et al. |
| 5,164,345 A | 11/1992 | Rice et al. |
| 5,167,710 A | 12/1992 | Leroux et al. |
| 5,169,558 A | 12/1992 | Smrt et al. |
| 5,174,821 A | 12/1992 | Matsuoka et al. |
| 5,176,732 A | 1/1993 | Block et al. |
| 5,177,305 A | 1/1993 | Pichat et al. |
| 5,190,737 A | 3/1993 | Weimer et al. |
| 5,191,456 A | 3/1993 | Sutherland et al. |
| 5,192,366 A | 3/1993 | Nishioka et al. |
| 5,194,334 A | 3/1993 | Lierdingen et al. |
| 5,198,052 A | 3/1993 | Ali |
| 5,198,275 A | 3/1993 | Klein |
| 5,210,989 A | 5/1993 | Jakel |
| 5,217,928 A | 6/1993 | Goetz et al. |
| 5,220,762 A | 6/1993 | Lehnert et al. |
| 5,223,090 A | 6/1993 | Klungness et al. |
| 5,226,274 A | 7/1993 | Sommerstein et al. |
| 5,229,437 A | 7/1993 | Knight |
| 5,232,497 A | 8/1993 | Dillenbeck et al. |
| 5,234,754 A | 8/1993 | Bache et al. |
| 5,236,773 A | 8/1993 | Sorathia et al. |
| 5,236,994 A | 8/1993 | Markusch et al. |
| D339,642 S | 9/1993 | Blazley et al. |
| 5,242,736 A | 9/1993 | Van Erden et al. |
| 5,244,318 A | 9/1993 | Arai et al. |
| 5,245,811 A | 9/1993 | Knorr |
| 5,247,773 A | 9/1993 | Weir |
| 5,252,526 A | 10/1993 | Whittemore |
| 5,253,991 A | 10/1993 | Yokota et al. |
| 5,254,228 A | 10/1993 | Westhof et al. |
| 5,256,180 A | 10/1993 | Garnier et al. |
| 5,256,349 A | 10/1993 | Sato et al. |
| 5,259,872 A | 11/1993 | Shinozaki et al. |
| 5,268,226 A | 12/1993 | Sweeney |
| 5,281,271 A | 1/1994 | Govani et al. |
| 5,282,317 A | 2/1994 | Carter et al. |
| 5,290,355 A | 3/1994 | Jakel |
| 5,292,690 A | 3/1994 | Kawachi et al. |
| 5,294,255 A | 3/1994 | Smetana et al. |
| 5,297,370 A | 3/1994 | Greenstreet et al. |
| 5,301,484 A | 4/1994 | Jansson et al. |
| 5,305,568 A | 4/1994 | Beckerman |
| 5,305,577 A | 4/1994 | Richards et al. |
| 5,312,858 A | 5/1994 | Folsom |
| 5,314,119 A | 5/1994 | Watt |
| 5,319,245 A | 6/1994 | Chen et al. |
| 5,319,909 A | 6/1994 | Singleterry |
| 5,323,581 A | 6/1994 | Jakel |
| 5,330,573 A | 7/1994 | Nakano et al. |
| 5,334,242 A | 8/1994 | O'Toole |
| 5,338,349 A | 8/1994 | Farrar |
| 5,338,357 A | 8/1994 | Takai et al. |
| 5,342,485 A | 8/1994 | Armbrust, Jr. |
| 5,342,530 A | 8/1994 | Aften et al. |
| 5,346,012 A | 9/1994 | Heathman et al. |
| 5,346,541 A | 9/1994 | Goldman et al. |
| 5,349,118 A | 9/1994 | Davidovits |
| 5,349,802 A | 9/1994 | Kariniemi |
| 5,352,288 A | 10/1994 | Mallow |
| 5,352,290 A | 10/1994 | Takeshita et al. |
| 5,358,676 A | 10/1994 | Jennings et al. |
| 5,366,637 A | 11/1994 | Turunc |
| 5,369,924 A | 12/1994 | Neudorf et al. |
| 5,372,678 A | 12/1994 | Sagstetter et al. |
| 5,378,279 A | 1/1995 | Conroy et al. |
| 5,383,521 A | 1/1995 | Onan et al. |
| 5,383,967 A | 1/1995 | Chase |
| 5,384,345 A | 1/1995 | Naton |
| 5,385,764 A | 1/1995 | Andersen et al. |
| 5,387,282 A | 2/1995 | Jakel |
| 5,387,283 A | 2/1995 | Kirkpatrick et al. |
| 5,387,626 A | 2/1995 | Bohme-Kovac et al. |
| 5,391,245 A | 2/1995 | Turner |
| 5,394,672 A | 3/1995 | Seem |
| 5,395,672 A | 3/1995 | Pingaud et al. |
| 5,395,685 A | 3/1995 | Seth et al. |
| 5,397,631 A | 3/1995 | Green et al. |
| 5,403,392 A | 4/1995 | Craig |
| 5,403,394 A | 4/1995 | Burgand |
| 5,405,498 A | 4/1995 | Pease |
| 5,407,983 A | 4/1995 | Naton |
| 5,410,852 A | 5/1995 | Edgar et al. |
| 5,415,734 A | 5/1995 | Backlund et al. |
| 5,421,867 A | 6/1995 | Yeager et al. |
| 5,425,985 A | 6/1995 | Irvin |
| 5,425,986 A | 6/1995 | Guyette |
| 5,428,931 A | 7/1995 | Ragsdale |
| 5,429,717 A | 7/1995 | Bokstrom et al. |
| 5,432,212 A | 7/1995 | Honda et al. |
| 5,432,215 A | 7/1995 | Girg et al. |
| 5,437,934 A | 8/1995 | Witt et al. |
| 5,439,518 A | 8/1995 | Francis et al. |
| 5,443,603 A | 8/1995 | Kirkendall |
| 5,447,798 A * | 9/1995 | Kamaishi et al. ............ 428/414 |
| 5,453,123 A | 9/1995 | Burge et al. |
| 5,453,310 A | 9/1995 | Andersen et al. |
| 5,455,212 A | 10/1995 | Das Chaklader et al. |
| 5,458,973 A | 10/1995 | Jeffs et al. |
| 5,461,839 A | 10/1995 | Beck |
| 5,465,547 A | 11/1995 | Jakel |
| 5,470,383 A | 11/1995 | Schermann et al. |
| 5,472,486 A | 12/1995 | Dragner et al. |
| 5,475,961 A | 12/1995 | Menchetti |
| 5,477,617 A | 12/1995 | Guy |
| 5,482,550 A | 1/1996 | Strait |
| 5,482,551 A | 1/1996 | Morris et al. |
| 5,484,480 A | 1/1996 | Styron |
| 5,490,889 A | 2/1996 | Kirkpatrick et al. |
| 5,501,050 A | 3/1996 | Ruel et al. |
| 5,508,072 A | 4/1996 | Andersen et al. |
| 5,511,316 A | 4/1996 | Fischer et al. |
| 5,517,795 A | 5/1996 | Doke |
| 5,520,779 A | 5/1996 | Bold et al. |
| 5,522,926 A | 6/1996 | Richard et al. |
| 5,522,986 A | 6/1996 | Shi et al. |
| 5,525,556 A | 6/1996 | Dunmead et al. |
| 5,526,627 A | 6/1996 | Beck |
| 5,531,824 A | 7/1996 | Burkes et al. |
| 5,534,348 A | 7/1996 | Miller et al. |
| 5,536,310 A | 7/1996 | Brook et al. |
| 5,545,297 A | 8/1996 | Andersen et al. |
| 5,547,505 A | 8/1996 | Nakatsu et al. |
| 5,549,859 A | 8/1996 | Andersen et al. |
| 5,556,458 A | 9/1996 | Brook et al. |
| 5,557,903 A | 9/1996 | Haddock |
| 5,558,710 A | 9/1996 | Baig |
| 5,558,822 A | 9/1996 | Gitman et al. |
| 5,559,170 A | 9/1996 | Castle |
| 5,561,173 A | 10/1996 | Dry |
| 5,562,832 A | 10/1996 | McOnie et al. |

| | | | | | | |
|---|---|---|---|---|---|---|
| 5,564,233 A | 10/1996 | Norton | | 5,858,083 A | 1/1999 | Stav et al. |
| 5,564,245 A | 10/1996 | Rademacher | | 5,863,477 A | 1/1999 | Kawai et al. |
| 5,565,026 A | 10/1996 | Hense et al. | | 5,866,057 A | 2/1999 | Roffael et al. |
| 5,577,024 A | 11/1996 | Malkamaki et al. | | 5,871,824 A * | 2/1999 | Bates |
| 5,580,378 A | 12/1996 | Shulman | | 5,876,561 A | 3/1999 | Tsai |
| 5,580,409 A | 12/1996 | Andersen et al. | | 5,878,543 A | 3/1999 | Mowery |
| 5,580,508 A | 12/1996 | Kobayashi et al. | | 5,883,029 A | 3/1999 | Castle |
| 5,580,907 A | 12/1996 | Savin | | 5,887,403 A | 3/1999 | Beck |
| 5,583,079 A | 12/1996 | Golitz et al. | | 5,888,322 A | 3/1999 | Holland |
| 5,591,684 A | 1/1997 | Kawachi et al. | | 5,891,374 A | 4/1999 | Shah et al. |
| RE35,460 E | 2/1997 | Klungness et al. | | 5,891,516 A | 4/1999 | Gstrein et al. |
| 5,598,671 A | 2/1997 | Ting | | 5,895,768 A | 4/1999 | Speit et al. |
| 5,601,789 A | 2/1997 | Ruhl et al. | | 5,897,701 A | 4/1999 | Soroushian et al. |
| 5,603,758 A | 2/1997 | Schreifels, Jr. et al. | | 5,899,256 A | 5/1999 | Rohatgi |
| 5,609,833 A | 3/1997 | Ruhl et al. | | 5,900,053 A | 5/1999 | Brothers et al. |
| 5,611,833 A | 3/1997 | Brahmbhatt et al. | | 5,916,095 A | 6/1999 | Tamlyn |
| 5,611,883 A | 3/1997 | Tompkins et al. | | 5,924,213 A | 7/1999 | Lee |
| 5,617,690 A | 4/1997 | Gibbs | | 5,925,449 A | 7/1999 | Davidovits |
| 5,618,173 A | 4/1997 | Ruhl et al. | | 5,928,777 A | 7/1999 | Cox et al. |
| 5,622,556 A | 4/1997 | Shulman | | 5,932,347 A | 8/1999 | Rapp et al. |
| 5,631,097 A | 5/1997 | Andersen et al. | | 5,935,699 A | 8/1999 | Barber et al. |
| 5,634,314 A | 6/1997 | Champagne | | 5,945,044 A | 8/1999 | Kawai et al. |
| 5,641,584 A | 6/1997 | Andersen et al. | | 5,945,208 A | 8/1999 | Richards et al. |
| 5,643,359 A | 7/1997 | Soroushian et al. | | 5,946,870 A | 9/1999 | Bifano et al. |
| 5,644,880 A | 7/1997 | Lehnert et al. | | 5,946,876 A | 9/1999 | Grace, Sr. et al. |
| 5,648,144 A | 7/1997 | Maurer et al. | | 5,948,505 A | 9/1999 | Puppin |
| 5,651,227 A | 7/1997 | Anderson | | 5,950,319 A | 9/1999 | Harris |
| 5,655,853 A | 8/1997 | Wormser | | 5,967,211 A | 10/1999 | Lucas et al. |
| 5,658,624 A | 8/1997 | Anderson et al. | | 5,968,257 A | 10/1999 | Ahrens |
| 5,658,656 A | 8/1997 | Whitney et al. | | 5,979,135 A | 11/1999 | Reeves |
| 5,661,939 A | 9/1997 | Coulis et al. | | 5,987,838 A | 11/1999 | Beck |
| 5,673,489 A | 10/1997 | Robell | | 5,989,335 A | 11/1999 | Soroushian et al. |
| 5,673,529 A | 10/1997 | Treister et al. | | 5,997,630 A | 12/1999 | Angelskar et al. |
| 5,675,955 A | 10/1997 | Champagne | | 5,997,632 A | 12/1999 | Styron |
| 5,676,536 A | 10/1997 | Ruhl et al. | | 6,000,185 A | 12/1999 | Beck et al. |
| 5,676,563 A | 10/1997 | Kondo et al. | | 6,008,275 A | 12/1999 | Moreau et al. |
| 5,681,384 A | 10/1997 | Liskowitz et al. | | 6,012,255 A | 1/2000 | Smid et al. |
| 5,692,345 A | 12/1997 | Mogaki et al. | | 6,018,924 A | 2/2000 | Tamlyn |
| 5,693,137 A | 12/1997 | Styron | | 6,026,616 A | 2/2000 | Gibson |
| 5,694,727 A | 12/1997 | Dobija | | 6,027,330 A | 2/2000 | Lifshits |
| 5,697,189 A | 12/1997 | Miller et al. | | 6,029,415 A | 2/2000 | Culpepper et al. |
| D388,884 S | 1/1998 | Karnoski | | 6,030,447 A | 2/2000 | Naji et al. |
| 5,705,542 A | 1/1998 | Roffael et al. | | 6,034,155 A | 3/2000 | Espeland et al. |
| 5,709,743 A | 1/1998 | Leture et al. | | 6,045,057 A | 4/2000 | Moor et al. |
| 5,714,002 A | 2/1998 | Styron | | 6,045,871 A * | 4/2000 | Matt et al. ............ 427/388.4 |
| 5,718,758 A | 2/1998 | Breslauer | | 6,046,269 A | 4/2000 | Nass et al. |
| 5,718,759 A | 2/1998 | Stav et al. | | 6,048,593 A | 4/2000 | Espeland et al. |
| 5,718,943 A | 2/1998 | Hsu et al. | | 6,049,987 A | 4/2000 | Robell |
| 5,722,386 A | 3/1998 | Fladgard et al. | | 6,055,787 A | 5/2000 | Gerhaher et al. |
| 5,724,783 A | 3/1998 | Mandish | | 6,063,856 A | 5/2000 | Mass |
| 5,725,652 A | 3/1998 | Shulman | | 6,077,327 A | 6/2000 | Hamayoshi et al. |
| 5,728,458 A | 3/1998 | Sweeney | | 6,079,175 A | 6/2000 | Clear |
| 5,729,946 A | 3/1998 | Beck | | 6,084,011 A | 7/2000 | Lucero et al. |
| 5,732,520 A | 3/1998 | Maietta | | 6,086,998 A | 7/2000 | Wihsmann et al. |
| 5,735,092 A | 4/1998 | Clayton et al. | | 6,093,473 A | 7/2000 | Min et al. |
| 5,736,594 A | 4/1998 | Boles et al. | | 6,096,388 A * | 8/2000 | Bates |
| 5,736,602 A | 4/1998 | Crocker et al. | | 6,105,888 A | 8/2000 | Goehner et al. |
| 5,741,844 A | 4/1998 | Nass et al. | | 6,110,525 A | 8/2000 | Stoddard |
| 5,743,056 A | 4/1998 | Balla-Goddard et al. | | 6,122,876 A | 9/2000 | Bado et al. |
| 5,743,393 A | 4/1998 | Webb et al. | | 6,122,877 A | 9/2000 | Hendrickson et al. |
| 5,744,078 A | 4/1998 | Soroushian et al. | | 6,134,855 A | 10/2000 | Beck |
| 5,749,187 A | 5/1998 | Umehara et al. | | 6,136,383 A | 10/2000 | Schwartz et al. |
| 5,768,841 A | 6/1998 | Swartz et al. | | 6,138,430 A | 10/2000 | Van Acoleyen et al. |
| 5,777,024 A | 7/1998 | Killilea et al. | | 6,139,620 A | 10/2000 | Suzuki et al. |
| 5,786,282 A | 7/1998 | Carter et al. | | 6,143,069 A | 11/2000 | Brothers et al. |
| 5,791,109 A | 8/1998 | Lehnert et al. | | 6,145,255 A | 11/2000 | Allaster |
| 5,795,515 A | 8/1998 | Fischer et al. | | 6,159,281 A | 12/2000 | Uchida et al. |
| 5,802,790 A | 9/1998 | Lamont et al. | | 6,161,353 A | 12/2000 | Negola et al. |
| 5,804,003 A | 9/1998 | Nishizawa et al. | | 6,161,354 A | 12/2000 | Gilbert et al. |
| 5,817,230 A | 10/1998 | Groppo, Jr. et al. | | 6,162,511 A | 12/2000 | Garnett et al. |
| 5,817,262 A | 10/1998 | Englert | | 6,164,032 A | 12/2000 | Beck |
| 5,820,668 A | 10/1998 | Comrie et al. | | 6,164,214 A | 12/2000 | Smorgon et al. |
| 5,842,280 A | 12/1998 | Robell | | 6,170,212 B1 | 1/2001 | Suchyna et al. |
| 5,848,508 A | 12/1998 | Albrecht | | 6,170,214 B1 | 1/2001 | Treister et al. |
| 5,848,509 A | 12/1998 | Knapp et al. | | 6,170,215 B1 | 1/2001 | Nasi |
| 5,849,055 A | 12/1998 | Arai et al. | | 6,171,651 B1 | 1/2001 | Brown |
| 5,851,607 A * | 12/1998 | Horinka et al. | | 6,176,920 B1 | 1/2001 | Murphy et al. |
| 5,853,475 A | 12/1998 | Liskowitz et al. | | 6,195,952 B1 | 3/2001 | Culpepper et al. |
| 5,857,303 A | 1/1999 | Beck et al. | | 6,204,214 B1 | 3/2001 | Singh et al. |

| | | |
|---|---|---|
| 6,207,077 B1 | 3/2001 | Burnell-Jones et al. |
| 6,214,309 B1 | 4/2001 | Shaw et al. |
| 6,226,947 B1 | 5/2001 | Bado et al. |
| 6,228,215 B1 | 5/2001 | Hoffman, Jr. |
| 6,245,196 B1 | 6/2001 | Martin et al. |
| 6,248,812 B1 | 6/2001 | Symons et al. |
| 6,254,845 B1 | 7/2001 | Ohashi et al. |
| 6,254,981 B1 | 7/2001 | Castle |
| 6,258,456 B1 | 7/2001 | Meyer |
| 6,270,567 B1 | 8/2001 | Matsuo et al. |
| 6,276,107 B1 | 8/2001 | Waggoner et al. |
| 6,277,189 B1 | 8/2001 | Chugh |
| 6,290,769 B1 | 9/2001 | Carkner |
| 6,295,777 B1 | 10/2001 | Hunter et al. |
| 6,298,626 B2 | 10/2001 | Rudden |
| 6,308,486 B1 | 10/2001 | Medland et al. |
| 6,315,489 B1 | 11/2001 | Watanabe et al. |
| 6,316,087 B1 | 11/2001 | Lehan |
| 6,319,456 B1 | 11/2001 | Gilbert et al. |
| 6,324,807 B1 | 12/2001 | Ishiko et al. |
| 6,325,853 B1 | 12/2001 | Hogan et al. |
| 6,332,921 B1 | 12/2001 | Brothers et al. |
| 6,335,100 B1 | 1/2002 | Tominaga et al. |
| 6,344,654 B1 | 2/2002 | Lesko |
| 6,346,146 B1 | 2/2002 | Duselis et al. |
| 6,346,165 B1 | 2/2002 | Markessini et al. |
| 6,352,952 B1 | 3/2002 | Jardine et al. |
| 6,355,100 B1 | 3/2002 | Hamabe et al. |
| 6,357,193 B1 | 3/2002 | Morris |
| 6,360,563 B1 | 3/2002 | Gerhardt et al. |
| 6,365,081 B1 | 4/2002 | Beck |
| 6,367,208 B1 | 4/2002 | Campbell et al. |
| 6,367,220 B1 | 4/2002 | Krause et al. |
| 6,367,288 B1 | 4/2002 | Lindner et al. |
| 6,372,694 B1 | 4/2002 | Osinga et al. |
| 6,375,853 B1 | 4/2002 | Yoon |
| 6,387,175 B1 | 5/2002 | Lynn et al. |
| 6,387,302 B1 | 5/2002 | Konya et al. |
| 6,415,574 B2 | 7/2002 | Beck |
| 6,419,788 B1 | 7/2002 | Wingerson |
| 6,421,973 B1 | 7/2002 | Gregg et al. |
| 6,423,167 B1 | 7/2002 | Palmer et al. |
| 6,425,218 B1 | 7/2002 | Doyon et al. |
| 6,430,885 B1 | 8/2002 | Ito et al. |
| 6,432,212 B1 | 8/2002 | Hirose et al. |
| 6,436,485 B1 * | 8/2002 | Sedlmeyr |
| 6,444,162 B1 | 9/2002 | Anshits et al. |
| 6,444,316 B1 | 9/2002 | Reddy et al. |
| 6,461,988 B2 | 10/2002 | Budd et al. |
| 6,475,275 B1 | 11/2002 | Nebesnak et al. |
| 6,482,258 B2 | 11/2002 | Styron |
| 6,485,561 B1 | 11/2002 | Dattel |
| 6,486,084 B2 | 11/2002 | Oda et al. |
| 6,488,762 B1 | 12/2002 | Shi |
| 6,488,792 B2 | 12/2002 | Mathieu et al. |
| 6,506,248 B1 | 1/2003 | Duselis et al. |
| 6,506,819 B1 | 1/2003 | Shukla et al. |
| 6,510,667 B1 | 1/2003 | Cottier et al. |
| 6,512,132 B2 | 1/2003 | Isoda et al. |
| 6,514,624 B2 | 2/2003 | Takemoto et al. |
| 6,516,580 B1 | 2/2003 | Maietta |
| 6,526,715 B2 | 3/2003 | Kaneko et al. |
| 6,526,717 B2 | 3/2003 | Waggoner et al. |
| 6,526,751 B1 | 3/2003 | Moeckel |
| 6,528,151 B1 | 3/2003 | Shah et al. |
| 6,531,189 B1 * | 3/2003 | Blatter et al. |
| 6,531,222 B1 | 3/2003 | Tanaka et al. |
| 6,533,848 B1 | 3/2003 | Robl et al. |
| 6,539,643 B1 | 4/2003 | Gleeson |
| 6,541,544 B1 * | 4/2003 | Hart et al. |
| 6,544,596 B2 * | 4/2003 | Clemens et al. ........... 427/407.1 |
| 6,550,203 B1 | 4/2003 | Little |
| 6,550,210 B1 | 4/2003 | Levine et al. |
| 6,551,567 B2 | 4/2003 | Konya et al. |
| 6,551,694 B1 | 4/2003 | Imamichi et al. |
| 6,562,444 B1 | 5/2003 | Gleeson et al. |
| 6,562,743 B1 | 5/2003 | Cook et al. |
| 6,572,697 B2 * | 6/2003 | Gleeson et al. |
| 6,572,698 B1 | 6/2003 | Ko |
| 6,582,819 B2 | 6/2003 | McDaniel et al. |
| 6,605,148 B2 | 8/2003 | Shirakawa et al. |
| 6,610,358 B1 | 8/2003 | Williams et al. |
| 6,613,424 B1 | 9/2003 | Putt et al. |
| 6,620,487 B1 | 9/2003 | Tonyan et al. |
| 6,626,947 B2 | 9/2003 | Lester et al. |
| 6,626,991 B1 | 9/2003 | Drochon et al. |
| 6,630,417 B2 | 10/2003 | Kawai et al. |
| 6,641,658 B1 | 11/2003 | Dubey |
| 6,644,162 B1 | 11/2003 | Temple et al. |
| 6,645,289 B2 | 11/2003 | Sobolev et al. |
| 6,648,961 B2 | 11/2003 | Brothers et al. |
| 6,656,265 B1 | 12/2003 | Garnier et al. |
| 6,660,077 B2 | 12/2003 | De Buen-Unna et al. |
| 6,660,078 B2 | 12/2003 | Brothers et al. |
| 6,676,744 B2 | 1/2004 | Merkley et al. |
| 6,676,745 B2 | 1/2004 | Merkley et al. |
| 6,679,011 B2 | 1/2004 | Beck et al. |
| 6,682,595 B1 | 1/2004 | Barbour |
| 6,689,286 B2 | 2/2004 | Wilde et al. |
| 6,689,451 B1 | 2/2004 | Peng et al. |
| 6,692,564 B2 | 2/2004 | Hofmann et al. |
| 6,692,570 B2 | 2/2004 | Cottier et al. |
| 6,699,576 B2 | 3/2004 | Peng et al. |
| 6,706,794 B1 * | 3/2004 | Tsuda et al. |
| D489,137 S | 4/2004 | Eichner et al. |
| 6,719,878 B1 | 4/2004 | Svedman et al. |
| D489,463 S | 5/2004 | Barnett |
| 6,737,008 B2 | 5/2004 | Gilbert et al. |
| D492,424 S | 6/2004 | Barnett |
| 6,749,897 B2 | 6/2004 | Naji et al. |
| 6,760,978 B2 | 7/2004 | Gleeson |
| 6,770,576 B2 | 8/2004 | Cook et al. |
| 6,777,103 B2 | 8/2004 | Merkley et al. |
| 6,809,131 B2 | 10/2004 | Li et al. |
| 6,811,603 B2 | 11/2004 | Brothers et al. |
| 6,814,798 B2 | 11/2004 | Vijn et al. |
| 6,824,605 B2 | 11/2004 | De Buen-Unna et al. |
| 6,824,715 B2 | 11/2004 | Cottier et al. |
| 6,832,652 B1 | 12/2004 | Dillenbeck et al. |
| 6,837,452 B2 | 1/2005 | Dezutter et al. |
| 6,872,246 B2 | 3/2005 | Merkley et al. |
| 6,875,503 B1 | 4/2005 | Famy et al. |
| 6,893,751 B2 | 5/2005 | Naji et al. |
| 6,901,713 B2 | 6/2005 | Axsom |
| 6,902,002 B1 | 6/2005 | Chatterji et al. |
| 6,902,797 B2 | 6/2005 | Pollock et al. |
| 6,913,819 B2 | 7/2005 | Wallner |
| 6,933,038 B2 | 8/2005 | Nanko et al. |
| 6,941,720 B2 | 9/2005 | DeFord et al. |
| 6,942,726 B2 | 9/2005 | Cook et al. |
| 6,969,422 B2 | 11/2005 | Mazany et al. |
| 7,028,436 B2 | 4/2006 | Bezubic, Jr. |
| 7,081,184 B2 | 7/2006 | Wester et al. |
| 7,089,709 B2 | 8/2006 | Waggoner |
| 7,112,549 B2 | 9/2006 | Yoshitomi et al. |
| 7,128,965 B2 | 10/2006 | Famy et al. |
| 7,147,055 B2 | 12/2006 | Brothers et al. |
| 7,155,866 B2 | 1/2007 | Bezubic, Jr. et al. |
| 7,191,570 B1 | 3/2007 | Eaton et al. |
| 7,226,525 B2 | 6/2007 | Vrbanac et al. |
| 7,300,546 B2 | 11/2007 | Jewell et al. |
| 7,325,325 B2 | 2/2008 | Gleeson |
| 7,338,702 B2 | 3/2008 | Swales et al. |
| 7,344,593 B2 | 3/2008 | Luo et al. |
| 7,396,402 B2 | 7/2008 | Naji et al. |
| 7,419,544 B2 | 9/2008 | Naji et al. |
| 7,455,727 B2 | 11/2008 | Trevithick |
| 7,754,320 B2 | 7/2010 | Lyons et al. |
| 2001/0006336 A1 | 7/2001 | Yi et al. |
| 2001/0043996 A1 | 11/2001 | Yamada et al. |
| 2001/0047741 A1 | 12/2001 | Gleeson et al. |
| 2002/0004111 A1 | 1/2002 | Matsubara et al. |
| 2002/0007926 A1 | 1/2002 | Jewell et al. |
| 2002/0007927 A1 | 1/2002 | Vahatalo et al. |
| 2002/0025436 A1 | 2/2002 | Meyer |
| 2002/0043996 A1 | 4/2002 | Iwamoto |
| 2002/0051892 A1 | 5/2002 | Laks et al. |
| 2002/0059886 A1 | 5/2002 | Merkley et al. |

| | | | |
|---|---|---|---|
| 2002/0069791 A1 | 6/2002 | Merkley et al. | |
| 2002/0088584 A1 | 7/2002 | Merkley et al. | |
| 2002/0100249 A1 | 8/2002 | Peng et al. | |
| 2002/0112827 A1 | 8/2002 | Merkley et al. | |
| 2002/0114888 A1 | 8/2002 | Magliocca | |
| 2002/0121229 A1 | 9/2002 | Jardine et al. | |
| 2002/0139082 A1 | 10/2002 | DeFord et al. | |
| 2002/0166479 A1 | 11/2002 | Jiang | |
| 2002/0170466 A1 | 11/2002 | Naji et al. | |
| 2002/0170467 A1 | 11/2002 | Naji et al. | |
| 2002/0170468 A1 | 11/2002 | Luo et al. | |
| 2002/0175126 A1 | 11/2002 | Naji et al. | |
| 2002/0179219 A1 | 12/2002 | Naji et al. | |
| 2002/0189499 A1 | 12/2002 | Naji et al. | |
| 2002/0189500 A1 | 12/2002 | Naji et al. | |
| 2002/0192510 A1 | 12/2002 | Naji et al. | |
| 2003/0000424 A1 | 1/2003 | Naji et al. | |
| 2003/0046891 A1 | 3/2003 | Colada et al. | |
| 2003/0054123 A1 | 3/2003 | Black et al. | |
| 2003/0056458 A1 | 3/2003 | Black et al. | |
| 2003/0089061 A1 | 5/2003 | DeFord et al. | |
| 2003/0100434 A1 | 5/2003 | Yoshitomi et al. | |
| 2003/0129323 A1 | 7/2003 | Dornieden et al. | |
| 2003/0148039 A1* | 8/2003 | Blum et al. | |
| 2003/0164119 A1 | 9/2003 | Naji et al. | |
| 2003/0165624 A1 | 9/2003 | Naji et al. | |
| 2003/0172606 A1 | 9/2003 | Anderson | |
| 2003/0177955 A1 | 9/2003 | Vijn et al. | |
| 2003/0200721 A1 | 10/2003 | Gleeson et al. | |
| 2003/0205172 A1 | 11/2003 | Gleeson et al. | |
| 2003/0213568 A1 | 11/2003 | Wester et al. | |
| 2003/0213569 A1 | 11/2003 | Wester et al. | |
| 2003/0213570 A1 | 11/2003 | Vrbanac et al. | |
| 2003/0213572 A1 | 11/2003 | Vrbanac et al. | |
| 2004/0028909 A1* | 2/2004 | Hodgson et al. | 428/413 |
| 2004/0043217 A1 | 3/2004 | Dezutter et al. | |
| 2004/0043686 A1 | 3/2004 | Batdorf | |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0082715 A1* | 4/2004 | Bayer et al. | 525/50 |
| 2004/0083677 A1 | 5/2004 | Bezubic et al. | |
| 2004/0099982 A1 | 5/2004 | Sirola et al. | |
| 2004/0103610 A1 | 6/2004 | Axsom | |
| 2004/0132843 A1 | 7/2004 | Baumgart et al. | |
| 2004/0139676 A1 | 7/2004 | Knauseder | |
| 2004/0145078 A1 | 7/2004 | Merkley et al. | |
| 2004/0159066 A1 | 8/2004 | Thiers et al. | |
| 2004/0163331 A1 | 8/2004 | Peng et al. | |
| 2004/0168615 A1 | 9/2004 | Luo et al. | |
| 2004/0211342 A1 | 10/2004 | Sprouts et al. | |
| 2004/0220317 A1 | 11/2004 | Loran et al. | |
| 2004/0262801 A1 | 12/2004 | Hojaji et al. | |
| 2005/0000172 A1 | 1/2005 | Anderson | |
| 2005/0005821 A1 | 1/2005 | Colombet et al. | |
| 2005/0011412 A1 | 1/2005 | Vijn et al. | |
| 2005/0016423 A1 | 1/2005 | Merkley et al. | |
| 2005/0045067 A1 | 3/2005 | Naji et al. | |
| 2005/0072056 A1 | 4/2005 | Famy et al. | |
| 2005/0126430 A1 | 6/2005 | Lightner et al. | |
| 2005/0138865 A1 | 6/2005 | Gleeson et al. | |
| 2005/0208285 A1* | 9/2005 | Lyons et al. | 428/292.1 |
| 2005/0208287 A1 | 9/2005 | Naji et al. | |
| 2005/0210790 A1 | 9/2005 | Wallner | |
| 2005/0235883 A1 | 10/2005 | Merkley et al. | |
| 2005/0262799 A1 | 12/2005 | Gleeson et al. | |
| 2005/0284339 A1 | 12/2005 | Brunton et al. | |
| 2006/0010800 A1 | 1/2006 | Bezubic | |
| 2006/0107872 A1 | 5/2006 | Chen | |
| 2006/0147681 A1 | 7/2006 | Dubey | |
| 2006/0168906 A1 | 8/2006 | Tonyan et al. | |
| 2006/0182946 A1* | 8/2006 | Zarb et al. | 428/413 |
| 2006/0288909 A1 | 12/2006 | Naji et al. | |
| 2007/0022913 A1 | 2/2007 | Wang et al. | |
| 2007/0077436 A1 | 4/2007 | Naji et al. | |
| 2007/0110981 A1 | 5/2007 | Killilea et al. | |
| 2007/0131145 A1 | 6/2007 | Biscan et al. | |
| 2007/0186822 A1 | 8/2007 | Utagaki et al. | |
| 2007/0209554 A1 | 9/2007 | Garcia Luna et al. | |
| 2007/0246864 A1 | 10/2007 | Utagaki et al. | |
| 2007/0261607 A1 | 11/2007 | Utagaki et al. | |
| 2008/0022627 A1 | 1/2008 | Gleeson et al. | |
| 2008/0072795 A1 | 3/2008 | Utagaki et al. | |
| 2008/0072796 A1 | 3/2008 | Utagaki et al. | |
| 2008/0095692 A1 | 4/2008 | Pham | |
| 2008/0096018 A1 | 4/2008 | Zhang et al. | |
| 2008/0104918 A1 | 5/2008 | Gleeson et al. | |
| 2008/0157428 A1 | 7/2008 | Utagaki et al. | |
| 2008/0163582 A1 | 7/2008 | Trevethick | |
| 2008/0176057 A1 | 7/2008 | Ukai | |
| 2008/0178771 A1 | 7/2008 | Utagaki et al. | |
| 2008/0190062 A1 | 8/2008 | Engbrecht et al. | |
| 2008/0191165 A1 | 8/2008 | Nakagawa | |
| 2008/0199677 A1 | 8/2008 | Ukai | |
| 2008/0203365 A1 | 8/2008 | Gleeson et al. | |
| 2008/0311346 A1 | 12/2008 | Ohno | |
| 2009/0025897 A1 | 1/2009 | Aizawa | |
| 2009/0076196 A1 | 3/2009 | Hojaji | |
| 2009/0090276 A1 | 4/2009 | Feng et al. | |
| 2009/0156385 A1 | 6/2009 | Biscan et al. | |

FOREIGN PATENT DOCUMENTS

| | | | |
|---|---|---|---|
| AR | 206788 | | 8/1976 |
| AR | 206890 | | 8/1976 |
| AR | 227376 | | 10/1982 |
| AR | 228671 | A1 | 3/1983 |
| AR | 291988 | | 1/1984 |
| AR | 240667 | | 8/1990 |
| AR | 015457 | A1 | 9/1998 |
| AR | 014046 | A1 | 11/1998 |
| AR | 014702 | A1 | 3/1999 |
| AR | 010221 | | 6/2000 |
| AR | 012644 | | 11/2000 |
| AT | 391131 | B | 8/1990 |
| AU | 515151 | * | 7/1980 |
| AU | 198170389 | | 10/1981 |
| AU | 8401582 | | 2/1983 |
| AU | 8858982 | | 3/1983 |
| AU | 44948/85 | | 1/1986 |
| AU | 0552930 | B2 | 6/1986 |
| AU | 55929/86 | | 10/1986 |
| AU | 94035 | S | 11/1986 |
| AU | 95878 | S | 3/1987 |
| AU | 98800 | S | 12/1987 |
| AU | 99683 | S | 2/1988 |
| AU | 572111 | B | 5/1988 |
| AU | 102662 | S | 1/1989 |
| AU | 606344 | | 1/1989 |
| AU | 103840 | S | 5/1989 |
| AU | 104552 | S | 8/1989 |
| AU | 108078 | S | 7/1990 |
| AU | 616088 | | 7/1990 |
| AU | 198946878 | | 7/1990 |
| AU | 110320 | S | 2/1991 |
| AU | 199176201 | | 6/1992 |
| AU | 13067/92 | A | 9/1992 |
| AU | 199215903 | A | 4/1993 |
| AU | 117138 | S | 5/1993 |
| AU | 118448 | S | 10/1993 |
| AU | 118862 | S | 11/1993 |
| AU | 643726 | | 11/1993 |
| AU | 199340398 | | 11/1993 |
| AU | 686135 | | 11/1994 |
| AU | 677649 | | 12/1994 |
| AU | 122634 | S | 2/1995 |
| AU | 123141 | S | 4/1995 |
| AU | 123142 | S | 4/1995 |
| AU | 659400 | | 5/1995 |
| AU | 681049 | | 9/1996 |
| AU | 702630 | | 11/1996 |
| AU | 130941 | S | 8/1997 |
| AU | 132812 | S | 2/1998 |
| AU | 732998 | | 5/1998 |
| AU | 6292698 | | 8/1998 |
| AU | 135097 | S | 9/1998 |
| AU | 199869111 | | 10/1998 |
| AU | 135557 | S | 11/1998 |
| AU | 199879922 | | 2/1999 |

| | | | | | | |
|---|---|---|---|---|---|---|
| AU | 734095 | 3/1999 | | CN | 1178202 A | 4/1998 |
| AU | 137291 S | 5/1999 | | CN | 2281378 Y | 5/1998 |
| AU | 9768198 | 5/1999 | | CN | 1199116 A | 11/1998 |
| AU | 199886116 | 5/1999 | | CN | 1224701 | 8/1999 |
| AU | 137791 | 7/1999 | | CN | 1251358 A | 4/2000 |
| AU | 99/26061 | 9/1999 | | CN | 1061328 C | 1/2001 |
| AU | 714529 | 1/2000 | | CN | 2435455 Y | 6/2001 |
| AU | 99/52711 | 3/2000 | | CN | 1394167 A | 1/2003 |
| AU | 11373/00 | 5/2000 | | CN | 1500038 A | 5/2004 |
| AU | 140607 S | 5/2000 | | CS | 222361 | 6/1983 |
| AU | 200078733 | 5/2001 | | CZ | 283459 | 4/1998 |
| AU | 200078752 | 5/2001 | | DE | 1952082 U | 12/1966 |
| AU | 200078753 | 5/2001 | | DE | 2421380 A1 | 1/1975 |
| AU | 200111200 | 5/2001 | | DE | 2344773 A1 | 3/1975 |
| AU | 746655 | 6/2001 | | DE | 2460879 A1 | 6/1976 |
| AU | 783430 | 6/2001 | | DE | 2460880 A1 | 6/1976 |
| AU | 200072012 | 6/2001 | | DE | 2610998 A1 | 9/1977 |
| AU | 200121275 | 6/2001 | | DE | 143936 | 9/1980 |
| AU | 735352 | 7/2001 | | DE | 3037220 A1 | 4/1982 |
| AU | 37683/01 | 9/2001 | | DE | 3046405 A1 | 9/1982 |
| AU | 2001250832 | 9/2001 | | DE | 3213521 A1 | 6/1983 |
| AU | 200143991 | 10/2001 | | DE | 3210326 | 9/1983 |
| AU | 200053659 | 3/2002 | | DE | 3232106 A1 | 3/1984 |
| AU | 147568 S | 4/2002 | | DE | 3308917 | 9/1984 |
| AU | 2001287356 | 4/2002 | | DE | 3314796 A1 | 10/1984 |
| AU | 2002211394 | 4/2002 | | DE | 3324671 A1 | 1/1985 |
| AU | 200218649 | 5/2002 | | DE | 3505335 | 8/1986 |
| AU | 148485 S | 7/2002 | | DE | 3601736 A1 | 7/1987 |
| AU | 2002240552 B2 | 9/2002 | | DE | 3711549 A1 | 10/1987 |
| AU | 200223229 | 11/2002 | | DE | 3621010 A1 | 1/1988 |
| AU | 2002301228 | 2/2003 | | DE | 3743467 A1 | 7/1989 |
| AU | 2002301288 A1 | 2/2003 | | DE | 3932176 A1 | 6/1990 |
| AU | 2003901529 | 3/2003 | | DE | 3908172 A1 | 9/1990 |
| AU | 2002301041 | 6/2003 | | DE | 3923800 A1 | 1/1991 |
| AU | 2002301511 A1 | 6/2003 | | DE | 4004103 | 8/1991 |
| AU | 2003204739 B2 | 7/2003 | | DE | 4104919 | 8/1992 |
| AU | 152915 S | 8/2003 | | DE | 4229572 | 3/1993 |
| AU | 153491 S | 10/2003 | | DE | 4209834 A1 | 9/1993 |
| AU | 153493 S | 10/2003 | | DE | 4228338 A1 | 10/1993 |
| AU | 153494 S | 10/2003 | | DE | 9403018 U1 | 5/1994 |
| AU | 153495 S | 10/2003 | | DE | 4316666 C1 | 12/1994 |
| AU | 153496 S | 10/2003 | | DE | 4410020 A1 * | 9/1995 |
| AU | 2003100890 | 12/2003 | | DE | 19607081 A1 | 8/1997 |
| AU | 2003204418 | 12/2003 | | DE | 19654836 A1 | 6/1998 |
| AU | 2003238481 | 12/2003 | | DE | 19858342 C1 | 2/2000 |
| AU | 2003266828 | 4/2004 | | DE | 20006112 U1 | 7/2000 |
| AU | 2003257906 A1 | 7/2004 | | DE | 19549535 C2 | 1/2001 |
| AU | 2003271286 | 7/2004 | | DE | 19962137 A1 | 6/2001 |
| AU | 2004204092 | 7/2004 | | DE | 20105063 U1 * | 8/2001 |
| AU | 2003268882 | 8/2004 | | DE | 10044641 A1 | 3/2002 |
| AU | 2005100347 | 5/2005 | | DE | 10106888 A1 * | 9/2002 |
| AU | 2004200339 | 6/2005 | | EP | 0007585 | 2/1980 |
| CA | 730345 | 3/1966 | | EP | 0012546 | 6/1980 |
| CA | 1040859 | 10/1978 | | EP | 0021362 | 1/1981 |
| CA | 1080601 A1 | 7/1980 | | EP | 0033133 A1 | 8/1981 |
| CA | 1084230 | 8/1980 | | EP | 0036275 A1 | 9/1981 |
| CA | 1177205 | 11/1984 | | EP | 0049365 A2 | 4/1982 |
| CA | 2242749 | 2/1999 | | EP | 0055504 | 7/1982 |
| CA | 2313456 | 6/1999 | | EP | 0056263 | 7/1982 |
| CA | 2405354 | 11/2001 | | EP | 0069095 | 1/1983 |
| CH | 368918 A | 4/1963 | | EP | 0084951 A2 | 8/1983 |
| CH | 606674 A5 | 11/1978 | | EP | 0102092 | 3/1984 |
| CH | 678882 A5 | 11/1991 | | EP | 0103097 B1 | 3/1984 |
| CH | 684285 A5 | 8/1994 | | EP | A-0104540 * | 4/1984 |
| CL | 32972 | 2/1980 | | EP | 0127960 B1 | 12/1984 |
| CL | 2346-01 | 9/2001 | | EP | 0136790 A2 | 4/1985 |
| CL | 2347-01 | 9/2001 | | EP | 0147429 | 7/1985 |
| CL | 2352-01 | 9/2001 | | EP | 0159046 A2 | 10/1985 |
| CL | 2353-01 | 9/2001 | | EP | 0159173 A2 | 10/1985 |
| CL | 461-02 | 3/2002 | | EP | 0173553 A1 | 3/1986 |
| CL | 693-2004 | 1/2005 | | EP | 0184477 A1 | 6/1986 |
| CN | 1032332 A | 4/1989 | | EP | 0188471 A1 | 7/1986 |
| CN | 1052519 A | 6/1991 | | EP | 0220073 B1 | 4/1987 |
| CN | 2149444 Y | 12/1993 | | EP | 0222339 A1 | 5/1987 |
| CN | 1081168 A | 1/1994 | | EP | 0242872 A1 | 10/1987 |
| CN | 1087885 A | 6/1994 | | EP | 0247817 A1 | 12/1987 |
| CN | 2170342 Y | 6/1994 | | EP | 0263723 A2 | 4/1988 |
| CN | 1099089 A | 2/1995 | | EP | 0287962 A1 | 10/1988 |
| CN | 1160070 A | 9/1997 | | EP | 0297186 A1 | 1/1989 |

| | | | | | | |
|---|---|---|---|---|---|---|
| EP | 0305209 A1 | 3/1989 | | GB | 752345 | 7/1956 |
| EP | 0314242 A1 | 5/1989 | | GB | 896910 | 5/1962 |
| EP | 0327351 A2 | 8/1989 | | GB | 1003850 | 9/1965 |
| EP | 0328431 A1 | 8/1989 | | GB | 1062410 | 3/1967 |
| EP | 0331666 | 9/1989 | | GB | 1066768 | 4/1967 |
| EP | 0347092 A | 12/1989 | | GB | 1086311 | 10/1967 |
| EP | 0359362 B1 | 3/1990 | | GB | 1125825 | 9/1968 |
| EP | 0376334 | 7/1990 | | GB | 1174902 | 12/1969 |
| EP | 0419657 | 4/1991 | | GB | 1258288 | 12/1971 |
| EP | 0428431 A1 | 5/1991 | | GB | 1265471 | 3/1972 |
| EP | 0430667 | 6/1991 | | GB | 1269357 | 4/1972 |
| EP | 0430995 B1 | 6/1991 | | GB | 1337129 | 11/1973 |
| EP | 0482810 A1 | 4/1992 | | GB | 1448320 | 9/1976 |
| EP | 0484283 A1 | 5/1992 | | GB | 1490711 | 11/1977 |
| EP | 0558239 A1 | 9/1993 | | GB | 1493202 | 11/1977 |
| EP | 0564447 A1 | 10/1993 | | GB | 1493203 | 11/1977 |
| EP | 0593779 A1 | 4/1994 | | GB | 1512084 | 5/1978 |
| EP | 0601594 A1 | 6/1994 | | GB | 1514239 | 6/1978 |
| EP | 0619227 B1 | 10/1994 | | GB | 1515521 | 6/1978 |
| EP | 0619277 B1 | 10/1994 | | GB | 1532922 | 11/1978 |
| EP | 0625618 A2 | 11/1994 | | GB | 1536663 | 12/1978 |
| EP | 0678488 | 10/1995 | | GB | 1543460 | 4/1979 |
| EP | 0683282 | 11/1995 | | GB | 2019386 | 10/1979 |
| EP | 0708213 A1 | 4/1996 | | GB | 2021186 A | 11/1979 |
| EP | 0717675 | 6/1996 | | GB | 2025928 | 1/1980 |
| EP | 0725044 A1 | 8/1996 | | GB | 2041384 | 9/1980 |
| EP | 0754663 A1 | 1/1997 | | GB | 1577648 | 10/1980 |
| EP | 0801037 B1 | 10/1997 | | GB | 1584175 | 2/1981 |
| EP | 0803484 A1 | 10/1997 | | GB | 2064989 | 6/1981 |
| EP | 0846666 B1 | 6/1998 | | GB | 2067622 | 7/1981 |
| EP | 0846668 B1 | 6/1998 | | GB | 2075079 A | 11/1981 |
| EP | 0891954 B1 | 1/1999 | | GB | 1604910 | 12/1981 |
| EP | 0931778 B1 | 7/1999 | | GB | 2078611 A | 1/1982 |
| EP | 0999232 B1 | 5/2000 | | GB | 2080851 | 2/1982 |
| EP | 1052262 A2 | 11/2000 | | GB | 2083512 A | 3/1982 |
| EP | 1088800 A2 | 4/2001 | | GB | 2106527 | 4/1983 |
| EP | 1094165 | 4/2001 | | GB | 2137977 | 10/1984 |
| EP | 1106236 A1 | 6/2001 | | GB | 2148871 | 6/1985 |
| EP | 1144129 B1 * | 10/2001 | | GB | 2199857 A | 7/1988 |
| EP | 1155794 A2 | 11/2001 | | GB | 2230772 | 10/1990 |
| EP | 1156021 | 11/2001 | | GB | 2248834 | 4/1992 |
| EP | 1160212 A1 | 12/2001 | | GB | 2252987 | 8/1992 |
| EP | 1172341 | 1/2002 | | GB | 2256867 | 12/1992 |
| EP | 1227199 A1 | 7/2002 | | GB | 2276875 | 10/1994 |
| EP | 1246782 | 10/2002 | | GB | 2307425 | 5/1997 |
| EP | 1334076 B1 | 8/2003 | | GB | 2330138 | 4/1999 |
| EP | 1346964 A2 | 9/2003 | | GB | 2340071 A | 2/2000 |
| EP | 1556313 A1 | 7/2005 | | GB | 2433497 A | 6/2007 |
| EP | 1801278 A1 | 6/2007 | | HU | 164419 | 2/1974 |
| EP | 1891984 | 2/2008 | | HU | 173947 | 9/1979 |
| EP | 1985671 A1 | 10/2008 | | HU | 180773 | 4/1983 |
| ES | 2033987 T3 | 4/1993 | | HU | 31027 | 4/1984 |
| FR | 895184 | 1/1945 | | HU | 0895285 | 1/1990 |
| FR | 990242 A1 | 9/1951 | | HU | 200511 B | 6/1990 |
| FR | 1557348 A | 2/1969 | | HU | 209836 B | 11/1994 |
| FR | 2248246 A1 | 5/1975 | | HU | 9602843 | 12/1996 |
| FR | 2405908 A1 | 5/1979 | | HU | 0001904 | 11/2000 |
| FR | 2451428 A1 | 10/1980 | | IT | 1311962 B1 | 3/2002 |
| FR | 2512440 A1 | 3/1983 | | JP | 21071968 | 1/1943 |
| FR | 2540160 A1 | 8/1984 | | JP | 57-058615 | 9/1955 |
| FR | 2562591 A1 | 10/1985 | | JP | 49116445 U | 2/1973 |
| FR | 2611432 A1 | 9/1988 | | JP | 49046761 Y1 | 12/1974 |
| FR | 2624870 A1 | 6/1989 | | JP | 50095319 | 7/1975 |
| FR | 2628775 A1 | 9/1989 | | JP | 50-100810 | 8/1975 |
| FR | 2671072 | 7/1992 | | JP | 75095319 | 4/1976 |
| FR | 2702790 A1 | 9/1994 | | JP | 51-23229 | 6/1976 |
| GB | 22139 | 11/1901 | | JP | 52051719 | 4/1977 |
| GB | 119182 | 9/1918 | | JP | 52052429 | 4/1977 |
| GB | 413294 | 7/1934 | | JP | 53050229 | 5/1978 |
| GB | 442098 | 2/1936 | | JP | 54025927 A | 2/1979 |
| GB | 449384 | 6/1936 | | JP | 54-021859 | 8/1979 |
| GB | 558239 | 12/1943 | | JP | 56130832 U | 3/1980 |
| GB | 558584 | 1/1944 | | JP | 55085756 A | 6/1980 |
| GB | 564447 | 9/1944 | | JP | 55095654 A | 7/1980 |
| GB | 682432 | 11/1952 | | JP | 55116684 | 9/1980 |
| GB | 731597 | 6/1955 | | JP | 55130847 A2 | 10/1980 |
| GB | 0740145 | 11/1955 | | JP | 56014466 A | 2/1981 |
| GB | 743866 | 1/1956 | | JP | 56048413 | 5/1981 |
| GB | 744070 | 2/1956 | | JP | 57017452 A2 | 1/1982 |

| | | | | | | |
|---|---|---|---|---|---|---|
| JP | 56041881 U | 9/1982 | | JP | 04342746 A | 11/1992 |
| JP | 57156361 A2 | 9/1982 | | JP | 04349155 | 12/1992 |
| JP | 57183344 A | 11/1982 | | JP | 5001532 U | 1/1993 |
| JP | 58000351 A | 1/1983 | | JP | 5-10636 U | 2/1993 |
| JP | 58045008 | 3/1983 | | JP | 05044323 | 2/1993 |
| JP | 58055034 A | 4/1983 | | JP | 5065760 A | 3/1993 |
| JP | 58059803 | 4/1983 | | JP | 05-040473 | 6/1993 |
| JP | 58110443 | 7/1983 | | JP | 5154816 A2 | 6/1993 |
| JP | 58149939 | 9/1983 | | JP | 5177625 A2 | 7/1993 |
| JP | 59045953 | 3/1984 | | JP | 05184246 A2 | 7/1993 |
| JP | 59107985 | 6/1984 | | JP | 05186261 A | 7/1993 |
| JP | 59203747 | 11/1984 | | JP | 5229859 | 9/1993 |
| JP | 59217659 A | 12/1984 | | JP | 2467261993 | 9/1993 |
| JP | 60105715 U | 7/1985 | | JP | 05-078738 | 10/1993 |
| JP | 60135211 A | 7/1985 | | JP | 05042192 Y2 | 10/1993 |
| JP | 60161381 | 8/1985 | | JP | 5-287234 | 11/1993 |
| JP | 60191074 | 9/1985 | | JP | 05287234 | 11/1993 |
| JP | 60242242 A | 12/1985 | | JP | 06001648 | 1/1994 |
| JP | 61019900 A | 1/1986 | | JP | 06017621 B2 | 1/1994 |
| JP | 61068967 A2 | 4/1986 | | JP | 6023889 A | 2/1994 |
| JP | 61141656 A | 6/1986 | | JP | 06024821 | 2/1994 |
| JP | 61178462 A2 | 8/1986 | | JP | H06-039959 | 2/1994 |
| JP | 62036055 A2 | 2/1987 | | JP | 06123158 A | 5/1994 |
| JP | 62036056 A | 2/1987 | | JP | 06127992 A | 5/1994 |
| JP | 62037444 | 2/1987 | | JP | 06144911 | 5/1994 |
| JP | 62207751 | 9/1987 | | JP | 06144912 A2 | 5/1994 |
| JP | 62235274 A | 10/1987 | | JP | 6-28563 Y2 | 8/1994 |
| JP | 88-052740 | 1/1988 | | JP | 06-229061 | 8/1994 |
| JP | 63008248 A | 1/1988 | | JP | 06256053 A2 | 9/1994 |
| JP | 6319636 U | 2/1988 | | JP | 06258053 A | 9/1994 |
| JP | 6330381 | 2/1988 | | JP | 6271371 | 9/1994 |
| JP | 63107849 A | 5/1988 | | JP | 06080264 B2 | 10/1994 |
| JP | 63117939 | 5/1988 | | JP | 06278116 A | 10/1994 |
| JP | 63-31426 B2 | 6/1988 | | JP | 6293578 A | 10/1994 |
| JP | 63-091537 | 6/1988 | | JP | 6341093 | 12/1994 |
| JP | 63248751 A | 10/1988 | | JP | 07010621 | 1/1995 |
| JP | 63257631 A | 10/1988 | | JP | 07024299 A | 1/1995 |
| JP | 63-47229 Y2 | 12/1988 | | JP | 07033502 A | 2/1995 |
| JP | 64-29843 A | 1/1989 | | JP | 07041592 A2 | 2/1995 |
| JP | 1029843 | 1/1989 | | JP | 07109165 A | 4/1995 |
| JP | 64020910 | 1/1989 | | JP | 07165455 A | 6/1995 |
| JP | 64022385 | 1/1989 | | JP | 07187734 | 7/1995 |
| JP | 64-37478 A | 2/1989 | | JP | 07196348 | 8/1995 |
| JP | 64-50541 U | 3/1989 | | JP | 7291701 A | 11/1995 |
| JP | 01141849 A2 | 6/1989 | | JP | 7291707 A | 11/1995 |
| JP | 1178658 | 7/1989 | | JP | 07292846 A2 | 11/1995 |
| JP | H01-032772 | 7/1989 | | JP | 07315869 A | 12/1995 |
| JP | 01290402 A | 11/1989 | | JP | 08012405 A | 1/1996 |
| JP | 02192447 A | 7/1990 | | JP | 08012450 A2 | 1/1996 |
| JP | 1924781990 | 7/1990 | | JP | 8040758 A | 2/1996 |
| JP | 64-25200 | 8/1990 | | JP | 8067541 A | 3/1996 |
| JP | 2204566 A | 8/1990 | | JP | 08068184 A2 | 3/1996 |
| JP | 02236350 A | 9/1990 | | JP | 08073283 A | 3/1996 |
| JP | 02283646 A | 11/1990 | | JP | 08074377 | 3/1996 |
| JP | 02289456 A2 | 11/1990 | | JP | 2928103 | 4/1996 |
| JP | 2714135 A | 12/1990 | | JP | 2507028 | 5/1996 |
| JP | 03016978 | 1/1991 | | JP | 08119708 | 5/1996 |
| JP | 3-004654 | 2/1991 | | JP | 08133864 A | 5/1996 |
| JP | 01128748 U | 6/1991 | | JP | 08-151246 | 6/1996 |
| JP | 3063641 U | 6/1991 | | JP | 2508554 B2 | 6/1996 |
| JP | 3066338 U | 6/1991 | | JP | 08169779 | 7/1996 |
| JP | 03208871 A | 9/1991 | | JP | 08175859 | 7/1996 |
| JP | 03295843 | 12/1991 | | JP | 08217561 A | 8/1996 |
| JP | 92052746 | 12/1991 | | JP | 08-284294 | 10/1996 |
| JP | 04002642 A | 1/1992 | | JP | 09-004122 | 1/1997 |
| JP | 92054171 | 1/1992 | | JP | 09020526 A | 1/1997 |
| JP | 4042875 A | 2/1992 | | JP | 09052747 A2 | 2/1997 |
| JP | 04089340 | 3/1992 | | JP | 2538120 | 3/1997 |
| JP | 04104945 | 4/1992 | | JP | 09067174 | 3/1997 |
| JP | 04144949 | 5/1992 | | JP | 09077543 | 3/1997 |
| JP | 4149352 | 5/1992 | | JP | 09092895 | 4/1997 |
| JP | 4182333 | 6/1992 | | JP | 09123340 | 5/1997 |
| JP | 04182335 A | 6/1992 | | JP | 9124327 | 5/1997 |
| JP | 4114937 | 7/1992 | | JP | 09193120 | 7/1997 |
| JP | 4193748 A | 7/1992 | | JP | 9201561 A | 8/1997 |
| JP | 4260645 A | 9/1992 | | JP | 9217659 A | 8/1997 |
| JP | 4292906 A | 10/1992 | | JP | 9227200 A2 | 9/1997 |
| JP | 04295072 A | 10/1992 | | JP | 09255383 A | 9/1997 |
| JP | 04300232 A2 | 10/1992 | | JP | 11077650 A | 9/1997 |

| | | | | | | | |
|---|---|---|---|---|---|---|---|
| JP | 09296560 | A | 11/1997 | NZ | 211265 | | 2/1985 |
| JP | 10025841 | A | 1/1998 | NZ | 20119 | | 10/1985 |
| JP | 10036161 | A | 2/1998 | NZ | 20120 | | 10/1985 |
| JP | 10046741 | A | 2/1998 | NZ | 20844 | | 11/1986 |
| JP | 10095648 | | 4/1998 | NZ | 218315 | | 2/1987 |
| JP | 10095922 | A2 | 4/1998 | NZ | 21875 | | 4/1988 |
| JP | 2978457 | | 5/1998 | NZ | 22705 | | 7/1989 |
| JP | 10121693 | A | 5/1998 | NZ | 221389 | | 12/1991 |
| JP | 10152356 | A | 6/1998 | NZ | 25267 | | 6/1993 |
| JP | 10245925 | A | 9/1998 | NZ | 230209 | | 12/1993 |
| JP | 10330146 | | 12/1998 | NZ | 247463 | | 12/1993 |
| JP | 11010631 | | 1/1999 | NZ | 25838 | | 4/1994 |
| JP | 11092202 | A | 4/1999 | NZ | 26065 | | 7/1994 |
| JP | 11099512 | A | 4/1999 | NZ | 26066 | | 7/1994 |
| JP | 11116299 | A | 4/1999 | NZ | 240533 | | 7/1996 |
| JP | 11139859 | | 5/1999 | NZ | 270310 | | 12/1996 |
| JP | 11210203 | | 8/1999 | NZ | 280409 | | 6/1997 |
| JP | 11217918 | | 8/1999 | NZ | 280235 | | 9/1997 |
| JP | 11241448 | A | 9/1999 | NZ | 259493 | | 10/1997 |
| JP | 11247307 | | 9/1999 | NZ | 248942 | | 11/1997 |
| JP | 11256683 | | 9/1999 | NZ | 242960 | | 12/1997 |
| JP | 11511110 | | 9/1999 | NZ | 306382 | | 2/1998 |
| JP | 11280172 | | 10/1999 | NZ | 314544 | | 6/1998 |
| JP | 3351461990 | | 12/1999 | NZ | 331553 | | 1/2000 |
| JP | 2000008581 | | 1/2000 | NZ | 336159 | | 3/2000 |
| JP | 2000043196 | | 2/2000 | NZ | 334899 | | 4/2000 |
| JP | 2000044367 | A | 2/2000 | NZ | 400643 | | 4/2000 |
| JP | 2000064554 | A2 | 2/2000 | NZ | 334918 | | 8/2000 |
| JP | 2000110272 | | 4/2000 | NZ | 335529 | | 12/2000 |
| JP | 2000119050 | | 4/2000 | NZ | 508055 | | 12/2000 |
| JP | 2000143307 | A | 5/2000 | NZ | 502017 | | 1/2001 |
| JP | 2000154612 | A | 6/2000 | NZ | 331336 | | 4/2001 |
| JP | 2000160057 | A | 6/2000 | NZ | 500215 | | 6/2001 |
| JP | 2000179104 | A | 6/2000 | NZ | 507846 | | 4/2002 |
| JP | 2000302498 | | 10/2000 | NZ | 502004 | | 8/2002 |
| JP | 2000302522 | A | 10/2000 | NZ | 505799 | | 2/2003 |
| JP | 2001026485 | A | 1/2001 | NZ | 504881 | | 3/2003 |
| JP | 2001163647 | A | 6/2001 | NZ | 512028 | | 7/2003 |
| JP | 2001240439 | A | 9/2001 | NZ | 516912 | | 7/2003 |
| JP | 2001240458 | A | 9/2001 | NZ | 524520 | | 9/2003 |
| JP | 2001300924 | A | 10/2001 | NZ | 518988 | | 10/2003 |
| JP | 2001316157 | A2 | 11/2001 | NZ | 517658 | | 11/2003 |
| JP | 2001316163 | A | 11/2001 | NZ | 520286 | | 5/2004 |
| JP | 2001-348285 | | 12/2001 | NZ | 521491 | | 6/2004 |
| JP | 2001335385 | A | 12/2001 | NZ | 525507 | | 9/2004 |
| JP | 2001336230 | A | 12/2001 | NZ | 525328 | | 2/2005 |
| JP | 2002003248 | | 1/2002 | NZ | 528304 | | 4/2005 |
| JP | 2002047750 | A | 2/2002 | NZ | 530605 | | 6/2005 |
| JP | 2002053361 | A2 | 2/2002 | NZ | 532182 | | 12/2005 |
| JP | 2002097732 | | 4/2002 | NZ | 536129 | | 2/2006 |
| JP | 2002161623 | A2 | 6/2002 | PL | 154782 | B1 | 9/1991 |
| JP | 2002231865 | A | 8/2002 | PL | 170678 | B1 | 1/1997 |
| JP | 2002354091 | A2 | 12/2002 | PL | 106840 | U1 | 1/1999 |
| JP | 2002364091 | A | 12/2002 | PL | 190446 | B1 | 9/1999 |
| JP | 2003-10781 | | 1/2003 | PL | 339671 | A1 | 1/2001 |
| JP | 550642003 | | 2/2003 | PL | 190627 | B1 | 12/2005 |
| JP | 2003073756 | A | 3/2003 | RU | 1606633 | A1 | 11/1990 |
| JP | 2003094419 | A | 4/2003 | RU | 2039019 | C1 | 7/1995 |
| JP | 2003335560 | | 11/2003 | RU | 2161695 | C2 | 1/2001 |
| JP | 2004027497 | A | 1/2004 | RU | 2167485 | C2 | 5/2001 |
| JP | 2004231480 | A | 8/2004 | RU | 2168485 | C1 | 6/2001 |
| JP | 2004314456 | A | 11/2004 | RU | 2243189 | C1 | 12/2004 |
| JP | 2005034695 | A2 | 2/2005 | SE | 9604599-2 | L | 6/1998 |
| KR | 920008773 | B | 10/1992 | SG | 97920847 | | 11/1990 |
| KR | 19940006957 | | 4/1994 | SG | 92906122 | | 10/1992 |
| KR | 9508587 | | 8/1995 | SG | 97912869 | | 4/1993 |
| KR | 1019950008587 | B1 | 8/1995 | SG | 93908341 | | 9/1993 |
| KR | 1019967005677 | | 11/1996 | SG | 95012084 | | 1/1994 |
| KR | 100231910 | B1 | 9/1999 | SG | 96026257 | | 4/1994 |
| KR | 200158855 | Y1 | 10/1999 | SG | 96120035 | | 4/1995 |
| KR | 200172372 | Y1 | 3/2000 | SG | 97059547 | | 5/1996 |
| KR | 2000014685 | | 3/2000 | SG | 98021017 | | 9/1996 |
| KR | 100274218 | B1 | 12/2000 | SG | 98021751 | | 9/1996 |
| KR | 2001053808 | | 7/2001 | SG | 98051485 | | 2/1997 |
| MX | 9604516 | | 12/1997 | SG | 97018402 | | 5/1997 |
| MY | 107883 | A | 6/1996 | SG | 98012917 | | 6/1997 |
| NO | 9901129 | | 9/2000 | SG | 99017030 | | 10/1997 |
| NZ | 19354 | A | 9/1984 | SU | 240472 | | 3/1969 |
| NZ | 210395 | | 11/1984 | SU | 411054 | | 1/1974 |

| | | | | | | |
|---|---|---|---|---|---|---|
| SU | 587123 | 1/1978 | | WO | WO-0065166 | 11/2000 |
| SU | 607813 | 5/1978 | | WO | WO-0071336 | 11/2000 |
| SU | 655678 | 4/1979 | | WO | WO-0116048 | 3/2001 |
| SU | 1114646 | 9/1984 | | WO | WO 01/24988 A1 | 4/2001 |
| SU | 1571024 | 6/1990 | | WO | WO-0125561 | 4/2001 |
| SU | 1650196 | 5/1991 | | WO | WO-0125562 | 4/2001 |
| SU | 1668346 | 8/1991 | | WO | WO-0126894 | 4/2001 |
| SU | 1724613 | 4/1992 | | WO | WO-0130927 | 5/2001 |
| TW | 278536 | 6/1996 | | WO | WO-0136191 | 5/2001 |
| TW | 278537 | 6/1996 | | WO | WO 01/43931 A1 | 6/2001 |
| TW | 282800 | 8/1996 | | WO | WO-0149952 | 7/2001 |
| TW | 408089 | 10/2000 | | WO | WO-0151427 | 7/2001 |
| TW | 150027 | 2/2001 | | WO | WO-0159228 | 8/2001 |
| TW | 255851 | 6/2006 | | WO | WO 01/68547 | 9/2001 |
| WO | WO 81/00422 | 2/1981 | | WO | WO-0165021 | 9/2001 |
| WO | WO-8102758 | 10/1981 | | WO | WO-0166485 | 9/2001 |
| WO | WO-8203386 | 10/1982 | | WO | WO-0168777 | 9/2001 |
| WO | WO-8301947 | 6/1983 | | WO | WO-0172863 | 10/2001 |
| WO | WO-8404765 | 12/1984 | | WO | WO-0173239 | 10/2001 |
| WO | WO-8500361 | 1/1985 | | WO | WO-0181666 | 11/2001 |
| WO | WO-8502394 | 6/1985 | | WO | WO 02/02481 | 1/2002 |
| WO | WO-8503966 | 9/1985 | | WO | WO-0212623 | 2/2002 |
| WO | WO-8600291 | 1/1986 | | WO | WO-0218486 | 3/2002 |
| WO | WO-8700827 | 2/1987 | | WO | WO 02/26897 A2 | 4/2002 |
| WO | WO-9002102 | 3/1990 | | WO | WO 02/28795 | 4/2002 |
| WO | WO-9008240 | 7/1990 | | WO | WO 02/28796 | 4/2002 |
| WO | WO-9101409 | 2/1991 | | WO | WO-0227109 | 4/2002 |
| WO | WO-9111321 | 8/1991 | | WO | WO-0228795 A | 4/2002 |
| WO | WO-9114057 | 9/1991 | | WO | WO-0228796 | 4/2002 |
| WO | WO-9114058 A1 | 9/1991 | | WO | WO-0231287 | 4/2002 |
| WO | WO-9200251 | 1/1992 | | WO | WO-0232830 | 4/2002 |
| WO | WO-9200927 A1 | 1/1992 | | WO | WO-0233164 | 4/2002 |
| WO | WO-9210440 | 6/1992 | | WO | WO 02/39039 A1 | 5/2002 |
| WO | WO-9217657 | 10/1992 | | WO | WO-0238518 | 5/2002 |
| WO | WO-9306316 | 4/1993 | | WO | WO-0242064 A1 | 5/2002 |
| WO | WO-9312303 | 6/1993 | | WO | WO-02055806 | 7/2002 |
| WO | WO-9321126 | 10/1993 | | WO | WO-02070145 | 9/2002 |
| WO | WO-9324711 | 12/1993 | | WO | WO-02070218 A1 | 9/2002 |
| WO | WO-9419561 | 9/1994 | | WO | WO-02070247 | 9/2002 |
| WO | WO-9507177 | 3/1995 | | WO | WO-02070421 | 9/2002 |
| WO | WO-9520066 | 7/1995 | | WO | WO-02070425 | 9/2002 |
| WO | WO-9526450 | 10/1995 | | WO | WO-02072499 | 9/2002 |
| WO | WO-9607538 | 3/1996 | | WO | WO-02081839 | 10/2002 |
| WO | WO-9614482 | 5/1996 | | WO | WO-02081840 | 10/2002 |
| WO | WO-9617996 | 6/1996 | | WO | WO-02081841 | 10/2002 |
| WO | WO-9640598 | 12/1996 | | WO | WO-02081842 | 10/2002 |
| WO | WO-9707968 | 3/1997 | | WO | WO-02096824 | 12/2002 |
| WO | WO-9708111 | 3/1997 | | WO | WO 03/74193 A2 | 9/2003 |
| WO | WO-9708401 | 3/1997 | | WO | WO-03106365 | 12/2003 |
| WO | WO-9721640 | 6/1997 | | WO | WO-2004011391 | 2/2004 |
| WO | WO 97/25389 | 7/1997 | | WO | WO-2004018090 A1 | 3/2004 |
| WO | WO-9723696 | 7/1997 | | WO | WO-2004031093 | 4/2004 |
| WO | WO-9727152 | 7/1997 | | WO | WO-2004033388 | 4/2004 |
| WO | WO-9728342 | 8/1997 | | WO | WO-2004063113 | 7/2004 |
| WO | WO-9731153 | 8/1997 | | WO | WO 2004087412 A1 * | 10/2004 |
| WO | WO-9803284 | 1/1998 | | WO | WO-2004101137 A1 | 11/2004 |
| WO | WO-9810151 | 3/1998 | | WO | WO-2005003478 | 1/2005 |
| WO | WO-9812149 | 3/1998 | | WO | WO-2005019550 | 3/2005 |
| WO | WO-9816697 | 4/1998 | | WO | WO-2005035900 | 4/2005 |
| WO | WO-9818855 | 5/1998 | | WO | WO-2005068741 | 7/2005 |
| WO | WO-9827027 | 6/1998 | | WO | WO-2005078210 | 8/2005 |
| WO | WO-9829353 | 7/1998 | | WO | WO-2005083191 | 9/2005 |
| WO | WO-9832713 | 7/1998 | | WO | WO-2006039762 | 4/2006 |
| WO | WO 98/45222 | 10/1998 | | WO | WO-2006056644 | 6/2006 |
| WO | WO-9908885 | 2/1999 | | WO | WO-2006086842 | 8/2006 |
| WO | WO-9910607 | 3/1999 | | WO | WO-2006091929 | 8/2006 |
| WO | WO-9913185 | 3/1999 | | WO | WO-2006113379 | 10/2006 |
| WO | WO-9922095 | 5/1999 | | WO | WO-2007005041 | 1/2007 |
| WO | WO-9931158 | 6/1999 | | WO | WO-2007009935 | 1/2007 |
| WO | WO-9935330 | 7/1999 | | WO | WO-2007067774 | 6/2007 |
| WO | WO-9943904 | 9/1999 | | WO | WO-2007115379 | 10/2007 |
| WO | WO-9964692 | 12/1999 | | WO | WO-2008066746 | 6/2008 |
| WO | WO-0000449 | 1/2000 | | WO | WO-2008100777 | 8/2008 |
| WO | WO-0008271 | 2/2000 | | | | |
| WO | WO-0014354 | 3/2000 | | | OTHER PUBLICATIONS | |
| WO | WO-0021901 | 4/2000 | | | | |
| WO | WO-0048960 | 8/2000 | | | | |
| WO | WO-0055446 | 9/2000 | | | | |
| WO | WO-0063506 | 10/2000 | | | | |

U.S. Appl. No. 60/536,172, filed Jan. 12, 2004, Lyons et al.*
World Minerals Corporation, "Celite Products", http://www.worldminerals.com/celite.html; 2006, 1 pg.

Submission in opposition proceeding of EP 1330571 entitled "Effect of the Extraction Temperature upon the COD value of a Cellulose Pulp," dated Aug. 1, 2008, 1 pg.

"Forming Handsheets for Physical Tests of Pulp," TAPI, T 205 sp-95, 1995, pp. 5-7.

"Glass" Corning Glass Works—reprinted version of the Encyclopedia of Chemical Technology (vol. 10) 2nd ed. (1955), pp. 542-543.

"Hardi-Plank and Surface Mold" article at internet http://www.nefsi.org/wwwboard/messages/439.html (Jun. 13, 2003) 2 pgs.

"Moisture in Pulp, Paper and Paperboard," TAPPI, T 412 om-94, pp. 1-3; 1994.

"Pre-extraction of hemicelluloses and subsequent kraft pulping Part I: alkaline extraction," TAPPI Journal(Jun. 2008) 6 pgs.

3M Company, "3M Material Safety Data Sheet 3M Glass Bubbles, Types K and S," (Apr. 10, 2006) 7 pgs.

Abo-El-Enein et al "Autoclaved Calcium Silicate Hydrates, I—Rates of Formation and Molar Composition," II Cemento, Mar. 1990; pp. 147-160.

Aitken, A. & Taylor, H.F.W., "Hydrothermal Reactions in Lime-Quartz Pastes" J. Appl. Chem., 10 (1960); pp. 7-15.

Amaral, S.T., et al. "Passivation of Pure Iron in Alkaline Solution Containing Silicate and Sulphate," Corrosion Science, V.41., 1999, 747-758.

Ambriose J. et al; "Metakaoline Blended Cements: An Efficient Way to Improve GRC Durability and Ductility," Int. Congress GRC/87, 6th Biennial Congress of the GRCA, Oct. 20-23, 1987, Edinburgh, Scotland, pp. 19-24.

Ameron Coatings, Amercoat 288 Flexible Water-Borne Acrylic Membrane, Aug. 1999, 2 pgs.

Arai, Y. et al. "Crystal Shape and Size Controls of Xonotlite," Gypsum and Lime, No. 248, 1994, pp. 17-25.

Ardex, "Sheltercoat Façade, Shelter Waterproofing Membranes," Mar. 10, 2002, 1 pg.

Asbridge et al. "Effects of Metakaolin, Water/Binder Ratio and Interfacial Transition Zones on the Microhardness of Cement Mortars" Cement and Concrete Research 32 (2002) pp. 1365-1369.

Assarsson, G.O., "Hydrothermal Reactions Between Calcium Hydroxide and Muscovite and Feldspar at 120-220 oC," J. Phys. Chem., 64 (1960) pp. 626-632.

Badogiannis et al. "Metakaolin as a Main Cement Constituent. Exploitation of Poor Greek Kaolins" Cement & Concrete Composites 27 (2005) pp. 197-203.

Benitez et al. "Optimization Technique for Sewage Sludge Conditioning With Polymer and Skeleton Builders," Water Research (1994), 28(10), 2067-73.

Berry, Craig, "Determination of the Influence of Pulp Chemical Oxygen Demand on the Flexural Strength of Cured Fibercement" (11 pgs), submitted in opposition proceeding of EP1330571, Aug. 1, 2008.

Bessey, G.E. "Hydrated Calcium Silicate Products Other Than Hydraulic Cements"—The Chemistry of Cements, edited by H.F.W. Taylor, Academic Press, vol. 2, 1964, pp. 101-133.

BGC Fibre Cement "Ceramic Tile Floor Underlay" Apr. 2002; pp. 1-7.

Blankenburg et al, "Quality and Possible Use of Brown Coal Fly Ash of East Germany" Frieberger Forschungshefter C (1986), C 413, p. 102-14.

Boddy et al. "Long-Term Testing of the Chloride-Penetration Resistance of Concrete Containing High-Reactivity Metakaolin" Cement and Concrete Research 31 (2001) pp. 759-765.

Celite Material Safety Data Sheet—revised date Jul. 10, 1992.

Chan, C.F. et al. "Formation of 11 A Tobermorite from Mixtures of Lime and Colloidal Silica with Quartz" Cem. Concr. Res., 8 (1978) pp. 135-138.

Chapter 5, Asbestos Cement Products, In Asbestos and Certain Asbestos Products: A Report on the Supply of Asbestos and Certain Asbestos Products, Competition Commission, Southampton Row, London, 1970-1975, pp. 25-40.

Chem Masters, "Polymer Coatings & Toppings—System Selection Guide" (www.ChemMasters.net), Oct. 15, 2008.

Chemical Abstract, vol. 90, No. 16, American Chemical Society, Columbus, US, Apr. 16, 1979.

Chemical Abstracts "Lightweight cement moldings." American Chemical Society, Columbus, US, vol. 104:114971, XP000183799, ISNN: 0009-2258, Apr. 7, 1986.

Babachev et al, "Plasticizing effect of aliphatic amines on cements", Build Sci Inst. Sofia Bulgaria; Epitoanyag Chemical Abstracts on STN 24(11), 430-5 (1972).

Chemical Abstracts, No. 54763d, vol. 117, No. 6; American Chemical Society, Columbus, US; Aug. 10, 1992.

Chemical Abstracts, vol. 86, No. 18,; American Chemical Society, Columbus, US, May 2, 1977; p. 303.

Chemical Abstracts, No. 51915a, XP 000186251, "Building Materials with Improved Black Mold Resistance," vol. 94, No. 8, Columbus, Ohio; Feb. 23, 1981.

Chemical Abstracts, vol. 95, No. 16; American Chemical Society, Columbus, US, Oct. 19, 1981, p. 288.

Chemical Abstracts, vol. 95, No. 2; American Chemical Society, Columbus, US, Jul. 13, 1981, p. 282.

Chemical Abstracts, vol. 98, No. 22; American Chemical Society, Columbus, US; May 30, 1983, p. 312.

Chilean patent application No. 170-97 dated Dec. 5, 1997.

Chilean patent application No. 2673-97 dated Jan. 30, 1997.

Collier et al. "Encapsulation of Iron Hydroxide Floc in Composite Cement" Immobilisation Science Lab., Dept of Engineering Materials, 2004, (4 pgs).

Office action for U.S. Appl. No. 10/753,089 (2004/0168615) mailed Jan. 16, 2008.

Information Disclosure Statement for U.S. Appl. No. 10/753,089 (2004/0168615) filed Sep. 28, 2007 and Oct. 29, 2007.

Amendment for U.S. Appl. No. 10/753,089 (2004/0168615) filed Oct. 31, 2007.

Courard et al. "Durability of Mortars Modified with Metakaolin" Cement and Concrete Research 33 (2003) pp. 1473-1479.

Coutts, R.S.P., "From forest to factory to fabrication," in Fibre Reinforced Cement and Concrete, ed. R.N. Swamy, E & FN Spon, London, 1992, pp. 31 to 47.

CRC Handbook of Chemistry & Physics, 62nd ed., p. F-124 (1981-1982).

Crennan et al. "Autoclaved Lime-Quartz Materials," Cement and Concrete Research, vol. 7, 1977, pp. 493-502.

CSR RendaLine—External Wall Cladding System—Brochure, Jan. 2002, pp. 1-36.

Derwent No. XP002335289, Database WPI Section Ch, Week 198610 Derwent Publications Ltd., London, GB; AN 1986.

Derwent No. XP002159268, Database WPI, Section Ch, Week, 23, Derwent Publications Ltd., London, GB, 1977.

Derwent No. XP002159269, Database WPI, Section Ch, Week, 23, Derwent Publications Ltd., London, GB, 1977.

De Silva P.S. et al. "Hydration of Cements Based on Metakaolin: Thermochemistry" Adv. In Cem. Res. vol. 3, No. 12, (Oct. 1990), pp. 167-177.

Declaration by Bill Adams and accompanying documents, Weyerhauser, dated prior to Oct. 17, 1999.

Department of Building and Housing, "Compliance Document for NZ Bldg Code Clause E2," 2005.

Digital Fire Corporation "Do You Need to Know About Eutectics to Make a Good Glaze?" (4 pgs) website article at http://www.digitalfire.ab.ca/cermat/education/119.php?PHPSESSID=1e2d7f3f3a24698394ecaae57ed3b06d5, dated Jul. 14, 2003.

Documents submitted by REDCO in opposition proceeding of EP1330571 dated Aug. 1, 2008.

Drogowska, M. et al. "Influence of Anions on the Passivity Behavior of Copper in Alkaline Solutions," Surface and Coatings Technology, 1988, 383-400, V. 34.

Drozhzhin et al., "Technical Monitoring of Microspheres from Fly Ashes of Electric Power Stations in the Russian Federation" (2005) 8 pgs.

Duxson, et al. "The Thermal Evolution of Metakaolin Geopolymers: Part 2—Phase Stability and Structural Development" Journal of Non-Crystalline Solids 353 (2007), p. 2186-2200.

Ekman et al., "Studies on the Behavior of Extractives in Mechanical Pulp Suspensions," The Institute of Paper Science and Technology; Jun. 1990.

Energy Seal "Elastomeric Wall Coatings" at http://www.energy-seal.com/es-home.nsf/products/everlast, Aug. 14, 2004.
EPS Plaster Cladding Systems, Technical and Installation Manual, Rockcote Architectural Coatings (NZ) Limited, Mar. 2003.
Examination Report for EP 00980518.5 dated Jan. 5, 2005.
Extended European Search Report for EP. 07008392.8, dated Oct. 8, 2007, 9 pp.
Extract from Webster's Third New International Dictionary of the English Language unabridged, ed Merriam-Webster Inc., Springfield, 1986.
Finnish Forest Industries Federal, "Mechanical Pulp Production" at http://english.forestindustries.fi/products/pulp/mechanical.html, dated Nov. 10, 2004 (2 pgs).
FORCE 10 Caribbean "Custom Features" Engineered Building Systems (1999) 5 pgs.
Fortes-Revilla et al. "Modelling of Slaked Lime-Metakaolin Mortar Engineering Characteristics in Terms of Process Variables" Cement & Concrete Composites 28 (458-467) 2006.
Gehm, H.W., "New & Basic Research Approaches to Liquid Effluent Treatment" Paper Trade Journal 142 (No. 16), 40-4, (1958) 46.
Gubka "Composition and Morphology of Cenospheres" at: http://www.atom.nw.ru/rie/projects/gubka/properties/cenospheres.shtml, Jul. 11, 2006, 2 pgs.
Gypsum Association Manual, 14th Edition 1994, p. 33-34.
HARDIHOME Lap Siding with the Embossed EZ Line Alignment Aid, Mar. 2000.
Harper, S., et al. "Resin Extraction and Effects on Pulp Quality," Proceedings of the 54th Appita Annual Conference, Melbourne, Apr. 3-6, 2000, pp. 575-580.
Hawley's Condensed Chemical Dictionary, Fourteenth Edition, Revised by Richard J. Lewis, Sr., published by John Wiley & Sons, Inc. 2002, pp. 447, 624, 903-904.
Hawley's Condensed Chemical Dictionary, definition of "dispersing agent," Richard Lewis Sr., Twelfth Edition, Van Nostrand Reinhold, 1993, p. 435.
Hoar, T.P., "The Production and breakdown of the passivity of metals," Corrosion Science, vol. 7, 1967, pp. 341-355.
International Preliminary Examination Report for PCT/US00/31729 dated Feb. 21, 2002.
International Preliminary Examination Report for PCT/US01/01908 dated Apr. 6, 2002.
International Preliminary Examination Report for PCT/US02/10608 dated Feb. 14, 2003.
International Preliminary Examination Report for PCT/US02/10609 dated Apr. 22, 2003.
International Preliminary Examination Report for PCT/US02/10760 dated Feb. 3, 2003.
International Preliminary Examination Report for PCT/US04/19980 dated Jul. 27, 2005.
International Preliminary Examination Report for PCT/US02/10610 dated Feb. 7, 2003.
International Preliminary Examination Report for PCT/US00/27451 dated Dec. 7, 2001.
International Preliminary Examination Report for PCT/IB2005/050709 dated Feb. 7, 2006.
International Preliminary Report on Patentability and Written Opinion of the International Searching Authority for PCT/US2006/006799, dated Aug. 28, 2007, 11 pp.
International Preliminary Report on Patentability for PCT/US2005/007581 dated Jun. 19, 2007.
International Search Report for PCT/US02/10609 dated Aug. 1, 2002.
International Search Report for AU/2004/903567, dated Jul. 26, 2004.
International Search Report for PCT/AU00/00320 dated May 31, 2000.
International Search Report for PCT/AU03/01315 dated Nov. 12, 2003.
International Search Report for PCT/AU97/00692 dated Dec. 3, 1997.
International Search Report for PCT/IB2005/050709 dated May 23, 2005.
International Search Report for PCT/US02/10608 dated Aug. 5, 2002.
International Search Report for PCT/US02/10610 dated Aug. 5, 2002.
International Search Report for PCT/US02/10760 dated Aug. 5, 2002.
International Search Report for PCT/US00/27451 dated Feb. 2, 2001.
International Search Report for PCT/US00/31729 dated Feb. 21, 2001.
International Search Report for PCT/US01/01908 dated Mar. 19, 2001.
International Search Report for PCT/US02/10609 dated Aug. 7, 2002.
International Search Report for PCT/US05/007581 dated Aug. 3, 2005.
International Search Report for PCT/US2004/019980 dated Sep. 15, 2004.
International Search Report for PCT/US2005/000957, dated Jun. 16, 2005.
International Search Report for PCT/US01/42243 (WO 02/028796 A2) dated May 15, 2002.
Isu et al. "Influence on quartz particle size on the chemical & mechanical properties of autoclaved aerated concrete," Cement & Concrete R., vol. 25, 1995, p. 243.
James Hardie, "External Wall Cladding," Oct. 1990, 2 pgs.
James Hardie, "Primeline Weatherboards," Oct. 1996, 8 pgs.
Jianquan et al "Research on Water Resistant Performance of Modified Polymer Cement Composite Reinforced with Fiber," Mar. 2003.
Johnson, C.A. et al., "Leaching Behavior and Solubility—Controlling Solid Phases of Heavy Metals in Municipal Solid Waste Incinerator Ash," Waste Management, vol. 16 (1-3), 1996, p. 129-134.
Joshi, P.S., et al. "Passivation of Carbon Steel Alloy in De-oxygenated Alkaline pH Media," Corrosion Science, vol. 34(8), 1993, p. 1367-1379.
JUBOCID "Special Anti-Mildew Coatings" Sep. 2002, 4 pgs.
Kennedy, G.C.; Econ. Geol. 45[7]:652 (1950).
Kolay, et al. "Physical, Chemical, Mineralogical, and Thermal Properties of Cenospheres From an Ash Lagoon" Dec. 29, 2000, pp. 539-542.
Kondo, R. et al., "Kinetics and Mechanism of Hydrothermal Reaction in Lime-Quartz-Water System" J. Ceram. Soc. Japan, 84 (1976) pp. 573-578.
Kondo, R., Int. Symp. "Kinetic Study on Hydrothermal Reaction Between Lime and Silica" Autoclaves Calcium Silicate Building Products, London, 1965, pp. 92-100.
Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.
Kuroki et al., "Cement-Bonded Board Industry and Market in Japan and New Technology Developments," 1995, pp. 105-112.
Letter from Sargent & Krahn reporting First Substantive Report for CL 653-2002 dated Apr. 1, 2005.
Letter from Sargent & Krahn reporting First Substantive Report for CL 656-2002 dated Apr. 11, 2005.
Letter from Sargent & Krahn reporting First Substantive Report for CL 655-2002 dated Jan. 31, 2005.
Letter from Saint Gobain to EPO in opposition proceeding of EP1330571 dated Aug. 1, 2008 (3 pgs).
Li et al. "Property Improvement of Portland Cement by Incorporating with Metakaolin and Slag" Cement and Concrete Research 33 (2003) 579-584.
Lin et al., "Improvements in the Durability of Cellulose Reinforced Cementitious Composites," Mechanisms of Chemical Degradation of Cement based systems, Proceedings of the Materials Research Society's Symposium of Mechanisms, Boston, Nov. 27-30, 1995.
Litigation documents corresponding to Civil Case Nos. SCVSS115246, 5:04-CV-00674-RT-SGL, 04-C-1621, 05-CV-44, and A2-04-152.
Locher, Friedrich W. "Fundaments of Production and Application" VBT; 2000.
M.D. Campbell and R.S.P. Coutts, "Wood Fibre-Reinforced Cement Composites," in Journal of Materials Science, 15 (1980), pp. 1962-1970.

Mai et al., "Effects of Water and Bleaching on the Mechanical Properties of Cellulose Fiber Cements" Journal of Materials Science 18 (1983) pp. 2156-2162.

Mai et al., "Slow Crack Growth in Bleached Cellulose Fibre Cements" Journal of Materials Science Letters 3 (1984), p. 127-130.

Mark, J.E., "Thermoset Elastomers" Applied Polymer Science 21st Century, (Clara D. Craver and Charles E. Carraher, Jr. ed., Elsevier) 2000, pp. 209-222.

MBT Middle East: Datasheets, Masterseal 300H, Jun. 2002.

Microspheres S.A., "What Are Cenospheres" at http://www.microspheres.co.za/contents.htm, printed Jul. 11, 2006, 5 pgs.

Muscovite Mica and Phlogopite Mica, from READE, internet article at http://www.reade.com/Products/Minerals_and_Ores/mica.html, from Aug. 6, 2007.

Neithalath, Narayanan, et al "Acoustic Performance and Damping Behavior of Cellulose Cement Composites," Cement & Concrete Composites 25 (2003).

New Zealand Department of Building and Housing, "Non-Flush Finished Joints," Acceptable Solution E2/AS1 (extract from the New Zealand Building Code) Jul. 1, 2005, 1 pg.

Notice of Opposition of CL 653-2002 (dated Mar. 2003).

Notice of Opposition of CL 654-2002 (dated Sep. 2003).

Notice of Opposition of CL. 655-2002 (dated Sep. 2003).

Notice of Opposition of CL. 656-2002 (dated Oct. 2003).

Notification of Office Action for CN 00815911.4 dated Sep. 24, 2004.

Notification of Office Action for CN 02811074.9 dated Feb. 4, 2005.

Notification of Office Action for CN 02811168.0 dated Mar. 18, 2005.

Notification of Office Action for CN 02811237.7 dated Mar. 18, 2005.

Novakovsky, V.M., "Thermodynamic and Kinetic Causes of Passivity," Electrochimica Acta, vol. 10, 1965, p. 353-365.

Omurtag, Y. et al. "Some Investigations on the Corrosion Characteristics on Fe—Si Alloys," Corrosion Science, vol. 10, 1970, 225-231.

Notice of Opposition to EP-B-1330571 filed by Redco on Dec. 15, 2006.

Notice of Opposition to EP-B-1330571 filed by St. Gobain Materiaux dated Jan. 19, 2007.

Panels: Materials and Manufacturing Process, M5 Tunnel Specification, Jul. 24, 2001, 17 pgs.

Pawlowski et al, "Novel Raw Material for Producing Heat Insulating Materials," Silikattechni, 33(11) 1982, p. 339-340.

PBS Distributors Ltd trade literature for Vent-Clad cladding system, Aug. 2003.

PCA (Portland Cement Assoc) article: "Concrete Homes—Fiber Cement Siding" website article printed 2005, 3 pgs.

Plaster Systems, Ltd., "Insulclad Cavity Based Exterior Plaster Cladding System Specification," Feb. 2004.

Plaster Systems, Ltd., "Insulclad Cavity Based Exterior Plaster Cladding System Specification," Oct. 2003.

Poon et al. "Rate of Pozzolanic Reaction of Metakaolin in High-Performance Cement Pastes" Cement and Concrete Research 31 (2001) pp. 1301-1306.

Ray A, et al., "Use of DTA to Determine the Effect of Mineralizers on the Cement-Quartz Hydrothermal Reactions" Thermochimica Acta 250 (1995) pp. 189-195.

Saikia et al. "Cementitious Properties of Metakaolin—Normal Portland Cement Mixture in the Presence of Petroleum Effluent Treatment Plant Sludge" Cement and Concrete Research 32 (2002), pp. 1717-1724.

Sauman et al; "Influence Explanation of Siliceous Materials Additive to Cement As Well As of Pastes Hydration and Their Treatment Temperature on the Lime Quantity Liberated by Rehydration" II Cemento, vol. 3, 1978, pp. 343-350.

SCAN-Test Method C 45:00, "COD and TOC Removable by Washing," Scandinavian Pulp, Paper and Board Testing Committee, Revised 2000.

SCAN-Test Method CM 45:91, "Water-Soluble Organic Matter," Scandinavian Pulp, Paper and Board Testing Committee, 1991.

Sevcik V., "Mixture for Refractory Purposes," Database EPODOC, the Hague, NL; abstract, XP002389199, (Oct. 15, 1997).

Shangai Building Materials, "Self-Leveling Elastic Water-Proofing Coating," Issue 6, 2000 (5 pgs).

Shapiro, A.D., et al., "Manufacture of Board Resistant to Biological Degradation," Bumazhnaya Promyshiennost 36, 12, XP-002335287 (1961).

Silica Fume, Cement Association of Canada, at htt:/www.cement.ca/cement.nsf/ep/07669ADF88663915852568A9005A7770?opendocument (printed Aug. 6, 2007), 2 pgs.

Singh, R., et al. "Stabilization of Natural Faujasite Zeolite: Possible Role of Alkaline Earth Metal Ions," Microporous and Mesoporous Materials, vol. 21, 1998, p. 103-109.

Skaggs et al. "Applications of Rehological Modifiers and Super Plasticizers in Cementitious Systems," American Concrete Institute SP, SP-148, (1994) p. 189-207.

Soroushian, Parviz "Development of Specialty Cellulose Fibers and Cementitious Matrices for Cellulose Fiber Reinforced Cement Composites" 1989.

Sphere Services Inc. "Cenospheres—Hollow Ceramic Microspheres" website article at http://www.sphereservices.com/ceno.html dated May 15, 2007 (2 pgs) <http://www.sphereservices.com/ceno.html>.

STOANZ Trade literature, 2004.

STOANZ Trade literature, Nov. 2003.

Stolica, N., "Pitting Corrosion on Fe—Cr and Fe—Cr—Ni Alloys," Corrosion Science, vol. 9, 1969, pp. 455-470.

Stromberg, C.B. "Washing of Dissolved Organic Solids From Pulp" Paper Asia, Oct. 1994, pp. 32-39.

Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.

Sukhotin, A.M. et al. "The Passivity of Iron in Acid and Alkaline Solutions," Corrosion Science, vol. 5, 1965, 393-407.

Supplemental European Search Report for EP 97943673 dated Mar. 27, 2001.

Tack, F.M. et al., "Metal Solubility as a Function of pH in a Contaminated Dredged Sediment Affected by Oxidation," Environmental Pollution, 1996, p. 199-208, V.91.

Technical File by Louisiana-Pacific Samao, Inc. sent to Redco on May 5, 1999.

Technische Information, Disbocolor 494, Acryl-Schutz, Disbon, Apr. 1996, 6 pp.

Technisches Merkblatt 51.800, Betonschutz 800 seidenmatt, Jan. 1, 1988, 4 pgs.

Technology Education, "Glass" by Encyclopedia Britannica http://www.geocities.com/tech_ed_2000/industrial/manufacturing/glass/glass.htm dated May 15, 2007.

Thai MDF Board Co., Ltd "Beger Synotex Acrylic TM 100% Emulsion Paint" at: http://www.thaimdf.com/paint_roofpaint.htm, 2003, 2 pp.

Third Party Observation by Redco NV in EP Application No. 04700639.0 filed Aug. 23, 2006.

Letter filed in opposition proceeding of EP1330571 dated Aug. 1, 2008.

Tourky, A.R. et al., "Further Studies on the Effect of C-content on the Corrosion and Passivity of Fe," Corrosion Science, 1968, p. 857-870, vol. 8.

Decision of Opposition in relation to Taiwanese Patent Application No. 85114421 (corresponding to US Patent No. 6,510,667), issued Aug. 3, 1998 (with Translation).

Decision of Appeal in relation to Taiwanese Patent Application No. 85114421 (corresponding to US Patent No. 6,510,667), issued Feb. 24, 1999 (with Translation).

U.S. Appl. No. 11/816,379, entitled "Flooring Sheet and Modular Flooring System;" first-named inventor: James Gleeson, filed Aug. 15, 2007.

U.S. Appl. No. 10/070,218 entitled "Extrudable Cementitious Material;" first-named inventor: Peter Goodwin, filed Jul. 19, 2002.

U.S. Appl. No. 10/648,010 entitled "Synthetc Microspheres and Methods of Making Same;" first-named inventor: Datta, filed Aug. 25, 2003 (abandoned 2005).

U.S. Appl. No. 10/977,344 entitled "Manufacture and Use of Engineered Carbide and Nitride Composites;" first-named inventor: Giang Biscan, filed Oct. 29, 2004.

U.S. Appl. No. 11/026,340 entitled "Methods and Formulations for Producing Low Density Products;" first-named inventor:Hojaji, filed Dec. 29, 2004 (abandoned Dec. 2005).

U.S. Appl. No. 10/873,723 entitled "Durable Building Article and Method of Making Same"; filed Jun. 21, 2004 (abandoned May 18, 2005).

U.S. Appl. No. 60/417,076 entitled: "Durable Medium Density Fibre Cement Composite;" first-named inventor:Luo, filed Oct. 7, 2002.

Vermiculite Properties, The Vermiculite Association, http://www.vermiculite.org/properties.htm (printed Aug. 6, 2007) 3 pgs.

Wattyl, "Granosite GranoSkin Decorative Membrane Datasheet 5.02," Jan. 6, 1999, 6 pgs.

Definition of "hollow," from Webster's II New Riverside University Dictionary (1984) p. 587.

Woods, Amy Lamb "Keeping a Lid on It: Asbestos-Cement Building materials" www.cr.nps.gov/hps/tps/recentpast/asbestosarticle.htm, Aug. 2000, 12 pgs.

Written Opinion for PCT/US01/42243 dated May 28, 2002.

Written Opinion of the International Searching Authority for PCT/US2004/019980 dated Dec. 20, 2005.

Xu et al. "Study on Particle Size Distribution and Chemical Activity of Mechanical Activity Fly Ash," Guisuanyan Tongbao 22(2), (2003), p. 73-76.

Zhou, Ming "The Trial of Antisepsis and Mothproof on Rural Timber Structure Architectures," China Wood Industry, Issue 2, 1987, pp. 16-24.

Rozman et al., "Improvements of Fibreboard Properties through Fibre Activation with Silane," Intern. J. Polymeric Mater., vol. 32 (1996) pp. 247-257.

Draft for Consultation: Cost benefit analysis. Proposed changes to Clause E2 of the New Zealand Building Code and Approved Documents B2/AS1, E2/AS1 & E2/VM1 Jun. 13, 2003.

Expert Declaration of Prof. Dr. Dahl dated Jan. 28, 2009.

Expert Declaration of Prof. Dr. Roffael dated Jan. 28, 2009.

MacDougall, F.H., Excerpt "Reactions in Heterogeneous Systems" Thermodynamics and Chemistry (1921), title page and p. 64.

ABSOLUTEASTRONOMY.com, "Perlite: Facts, Discussion Forum, and Encyclopedia Article" at: http://www.absoluteastronomy.com/topics/Perlite (dated Jul. 21, 2010).

USPTO, English translation of JP 19931102 (JP 05 287234), translated by The McElroy Translation Company, translation dated Jul. 2010.

Supplementary European Search Report, Sheet B and Annex for EP Application No. 04724664 dated Oct. 15, 2009.

Derwent Abstract Accession No. 2009-E28129, CN 101337822, published Jan. 7, 2009.

Derwent Abstract Accession No. 1992-401310, HU 60701, published Oct. 28, 1992.

Derwent Acc No. 1991-295696 for WO 91/14058 published Sep. 19, 1991.

Blankenhorn et al., "Temperature and Moisture Effects on Selected Properties of Wood Fiber-Cement Composites" Cement and Concrete Research 29 (1999) pp. 737-741.

British Board of Agreement, Certificate No. 84/1330 for Duracem Slates, dated Jun. 26, 1984.

British Board of Agreement, Certificate No. 96/3283 for Eternit 2000 Slates and Fittings, dated Sep. 20, 1996.

Eternit Gevel, Multiboard 38xx Product Information (with translations), dated Mar. 18, 2002 and Sep. 14, 2001 and Jun. 13, 2003.

Kalbskopf R, et al., "Durability of Fiber-cement Roofing Products," from the International Inorganic Bonded Wood and Fiber Composites Conference, Sep. 2002, 7 pp.

Redco NV, Observation by a Third Party filed with EP Application No. 01975765.7, Jul. 2, 2010.

Redco NV, Observation by a Third Party filed with EP Application No. 01973377.3, Jun. 25, 2010.

Saint Gobain Recherche, Letter to the European Patent Office filed with opposition to EP 1330571 (and translation), Aug. 1, 2008.

* cited by examiner

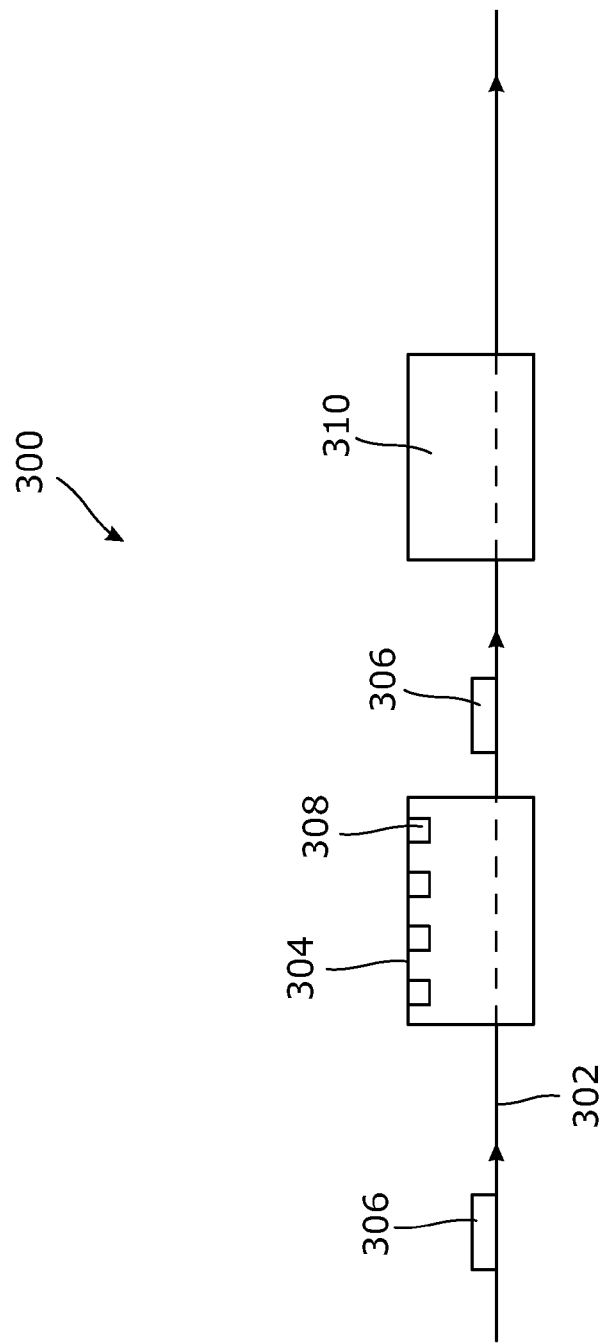

COMPOSITE CEMENT ARTICLE INCORPORATING A POWDER COATING AND METHODS OF MAKING SAME

RELATED APPLICATIONS

This application claims the benefit of U.S. Provisional Application Ser. No. 60/586,807 filed Jul. 9, 2004, the entirety of which is hereby incorporated by reference.

BACKGROUND OF THE INVENTION

1. Field of the Invention

This invention generally relates to cementitious composite materials, and in particular, to a composite cement article that incorporates a protective powder coating and methods of manufacturing the article.

2. Description of the Related Art

Fiber reinforced cement (FRC) products are increasingly being used in a variety of building applications and in an increasing range of climatically different regions. Such products have gained favor for their inherent fire, water, pest and mold resistance, as well as their general affordability, which makes them particularly suitable for use in meeting commercial as well as residential building codes.

However, as with timber and other conventional building materials, exposure to the elements can cause physical and chemical changes in FRC products over time. Moreover, prior to installation, building materials are subject to physical damage during shipping and handling. To manage the detrimental effects of exposure and handling, it is known to protect FRC products with coatings or laminates or to attach protective means such as slip sheets to the products. Typically, laminates can be attached using adhesives and coatings can be applied directly to the product.

In cases where the fiber cement articles are treated by the application of laminates or surface coatings which rely primarily on mechanical keying or chemical bonding to the exterior surfaces of the substrate, the end product remains susceptible to both physical and chemical modes of degradation. Physical modes of degradation, for example, include thermal expansion and contraction, flexing due to wind loads. As such, these prior art surface coatings or laminates are prone to discoloration, delamination, blistering, and dimensional instability when affected by environmental agents.

Similar to environmental damages, mishandling during installation can also impact the service life of a fiber cement product as applied surface treatments may crack, tear or suffer abrasion damage of delamination. While manufacturers of FRC products typically recommend that the rear mounting surfaces of FRC panels be sealed appropriately, this is not always done correctly, if at all. If coatings are poorly applied, then different portions of the FRC product may weather at different rates depending on the degree of exposure and the integrity of sealers or other surface treatments. When different portions of the same FRC product weather at different rates, internal stresses may develop. If these stresses are significant, they can manifest themselves visually in the form of surface cracking of the panels or the coating or both and/or warping and the like.

Additionally, the existing factory processes for coating fiber cement products suffer from drawbacks. For example, treatment of the FRC products during conversion of the board base panel product into a customized cladding sheet is time and labor intensive and the product is thus correspondingly expensive. Also multiple types of coatings (e.g., primers, tie coats, topcoats, color coats, and clear coats) are often required to be applied and cured in sequence to achieve the performance requirements demanded of the composite surface while in use. Therefore, it would be desirable to substantially reduce the number of surface treatment and/or coatings required to simultaneously achieve the requisite performance needed by the composite surface in a given application. One example of this would be a coating that simultaneously is highly wear resistant, water repellant, maintains adhesion over a long exposure to freeze/thaw and UV exposure and is capable of achieving this with a substantially reduced coating film thickness.

It is also known in the art to provide reinforcing fibers or mesh to a fiber cement article to enhance the toughness, bending strength, or tensile strength of the article. For the purpose of this disclosure, when fibers are referred to, it will be implied that the fibers may be in the form of long continuous fibers, short discontinuous fibers, or meshes of fibers having a regular, such as woven, or irregular, such as nonwoven, appearance.

Fibers themselves can be comprised of natural or synthetic polymers or blends thereof. Blends of natural and synthetic polymers can also be used to enhance fiber cement composite performance. Natural cellulose fibers are inexpensive, resistant to degradation in an autoclave, hydrophilic and relatively easy to disperse in hydraulically settable binder composites like FRC. However, they are also shorter and not efficient at enhancing toughness or bending strength. Polymeric fibers can be made in many configurations and lengths but are hydrophobic and more difficult to process in hydraulic pastes and slurries. Also, only certain types of polymer fibers are resistant to autoclave conditions. Using blends of cellulose and polymeric fibers requires multiple material handling streams and the resulting composite properties can be limited by the need to manage the undesirable properties of each type. Handling multiple fiber types also can add to the manufacturing cost of a fiber cement article. It would therefore be desirable to find a way of combining the favorable features of polymeric and cellulosic fibers.

Both cellulose and synthetic polymeric fibers may also have treatments that are used to enhance or optimize the bonding or distribution of the fibers to the cementitious matrix wherein they are distributed or placed. These treatments often involve cured polymeric or polymerizable materials. Examples of these fiber treatments are disclosed in PCT patent applications WO0228796, entitled "FIBER CEMENT COMPOSITE MATERIALS USING CELLULOSE FIBERS LOADED WITH INORGANIC AND/OR ORGANIC SUBSTANCES" and WO0228795, entitled "FIBER CEMENT COMPOSITE MATERIALS USING SIZED CELLULOSE FIBERS", which are herein incorporated in full as references. However, the preparation of reinforcing fibers, especially when the surfaces are treated, involves additional processing steps that add to the cost of an FRC composite product.

It is thus an object of the present invention to provide a fiber cement composite article and methods of making that article which will overcome or ameliorate one or more of the disadvantages of the prior art.

SUMMARY OF THE INVENTION

In one aspect, the preferred embodiments of the present invention provide a cementitious composite article. The composite article comprises a cementitious substrate having a first surface, a powder coating layer formed on the first surface, and a surface interface interposed between the first surface and the powder coating layer. The surface interface facilitates application of the powder coating layer onto the first surface of the substrate. In one embodiment, the surface interface comprises a sealer coating formed on the first surface. In another embodiment, the surface interface comprises a modified surface porosity. In yet another embodiment, the surface interface comprises a modified surface moisture level. The powder coating layer preferably comprises a material selected from the group consisting of urethanes, epoxies, acrylics, polyesters, and combinations thereof. The sealer coating preferably comprises a material selected from the group consisting of polymer latex, polymer emulsion, silanes, silanols, siloxanes, and combinations thereof. The cementitious composite article can be a variety of different articles including a fiber cement cladding panel, a fiber cement column, a fiber cement siding, or other building articles.

In another aspect, the preferred embodiments of the present invention provide a method of applying a powder coating to a fiber cement article. The method includes applying a surface interface to a first surface of the fiber cement article, wherein the surface interface comprises a curable material selected to reduce the degree of fiber swelling induced by subsequent applications of a powder coating. The method further includes partially curing the curable material to a gel-like state and then applying a polymer coating in powder form to the first surface. The method also includes curing the polymer coating to form a hardened protective layer on the first surface. In one embodiment, the polymer coating and the gel-like curable material are co-cured to a hardened film in the same step. Preferably, a near infrared process is used to cure the polymer coating. In another embodiment, the method further comprises removing a predetermined amount of moisture from the first surface of the fiber cement article prior to applying the polymer coating in powder form to the first surface. The polymer coating is preferably applied to the first surface using an electrostatic spray process.

In yet another aspect, the preferred embodiments of the present invention provide a method of forming a film on a fiber cement surface. The method comprises treating the fiber cement surface, depositing a plurality of finely divided, heat fusible material onto the fiber cement surface, fusing the finely divided material into a continuous film, and curing the film. Preferably, the film is cured using a process that does not use combustions sources. In one embodiment, treating the fiber cement surface comprises modifying the porosity of the surface. In a preferred implementation, the porosity of the fiber cement surface is modified by altering the surface with an inorganic filler which fills the voids and pores present in the surface. In another embodiment, treating the fiber cement surface comprises modifying the moisture level of the surface, which can include drying the surface. In another embodiment, treating the fiber cement surface comprises forming a sealer coating on the surface. The fiber cement surface can be contoured and comprises one or more grooves.

BRIEF DESCRIPTION OF THE DRAWINGS

FIG. 3 is a schematic illustration of an apparatus for applying powder coating to the composite cementitious building article of FIG. 1.

DETAILED DESCRIPTION OF PREFERRED EMBODIMENTS

Figure 1:
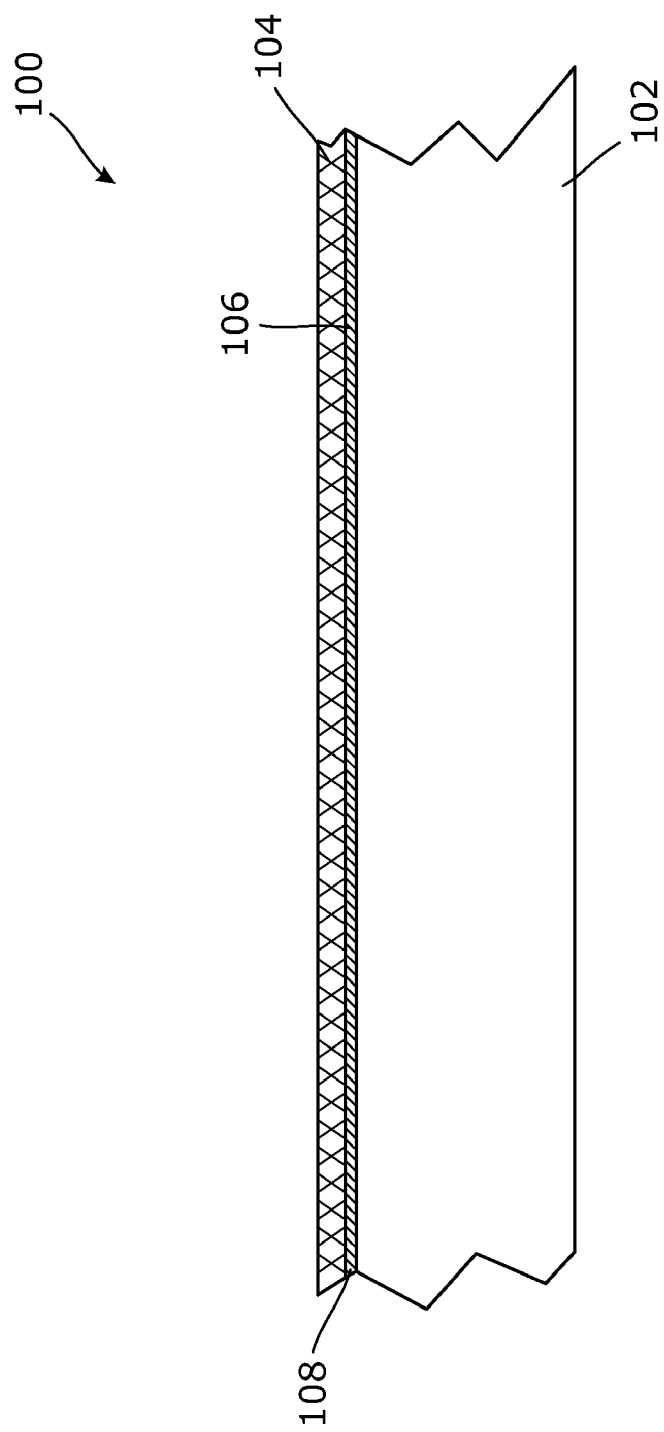
FIG. 1 is a cross sectional view of a composite cementitious building article of one preferred embodiment, which incorporates a powder coating on at least one surface and a surface interface between the powder coating and the substrate.

The preferred embodiments of the present invention provide a fiber cement composite article having a protective powder coating on at least one surface. The preferred embodiments also provide methods of applying powder coating to a fiber cement substrate and adapting the fiber cement composite material to better accommodate and utilize the advantages of powder coating technology to reliably and economically produce fiber-reinforced cement composites with durable and functional coatings.

In a preferred embodiment, the curable powder coating chemistry, final film thickness and film properties are selected to enhance certain desirable characteristics of the fiber cement composite article such as durability, aesthetics, abrasion resistance, water repellency, impact resistance or others, either alone or in combination. The powder coating and its method of application are selected to be compatible with the known methods of manufacturing fiber cement and preferably reduce the overall cost of applying a coating to a fiber cement article.

One embodiment of the invention is used in relation to building cladding panels suitable for application to the inner or outer surfaces of buildings and will be described hereinafter with particular reference to this preferred field. However, it will be appreciated that the invention is equally applicable to other cementitious products where improved weathering resistance, durability, strength, toughness or surface appearance are important, such as for example fiber reinforced cement sidings, cladding, fencing, decking sheets or planks shaped bodies having a composite inner and/or outer surface such as pipes, columns, and other structural shapes.

It is generally understood that powder coating can be applied to a substrate using an electrostatic spray (ESP) system. In a typical ESP process, the coating powder is maintained in a fluidized bed reservoir, injected into an air stream and carried to a spray gun through where the powder is charged by passing through a stable corona discharge created by a high voltage source or by tribocharging where the powder is charged by friction within the spray gun, or a combination of the two techniques.

The charged powder is then transported to a grounded part or substrate to be coated through a combination of electrostatic and aerodynamic forces. The powder is typically projected toward the substrate so that the aerodynamic forces bring the powder particles as close as possible to the substrate, where electrostatic forces predominate and cause the particles to be attracted to and deposited on the grounded substrate. The coated substrate is then placed in an oven or furnace where the individual powder particles melt, flow and form a continuous film on the substrate. Several process aspects are typically involved in ESP systems, among which are powder charging, powder transport, adhesion mechanisms, self-limitation, back ionization and Faraday cage effect. The general state of the art in using an electrostatic spray (ESP) system to apply coatings to nonconductive substrates is described in U.S. Pat. No. 5,851,607, which is hereby incorporated by reference in its entirety.

Certain challenges can exist when attempting to apply powder coating to a cementitious composite material, such as a fiber cement article. For example, cementitious materials, while not combustible, are still susceptible to damage or alteration by the conventional heat treatment used to cure powder coatings. Ovens, IR lamps and the like can dehydrate the surface of gypsum or cement based composites, making them more friable, potentially reducing long term coating adhesion. Direct fired ovens contain carbon dioxide, which will react with cementitious materials to form carbonates, which can also affect the long term durability of coatings applied to such materials and thus the long term durability of composites made using cementitious materials such as gypsum, Portland Cement, and/or other cements.

The inventor has found that the above-mentioned drawbacks may be overcome or ameliorated at least in part by adapting the surface of a fiber cement article in order to better facilitate the use of powder coating technology.

FIG. 1 illustrates a cementitious composite article 100 of one preferred embodiment of the present invention. The cementitious composite article 100 has a cementitious substrate 102 and a polymeric coating 104 formed on a surface 106 of the substrate 102. In a preferred embodiment, the cementitious composite article 100 is a fiber cement article reinforced with fibers such as cellulosic fibers, polymeric fibers, loaded cellulosic fibers, sized cellulosic fibers, hollow fibers, mineral fibers, glass fibers, or combinations thereof. The fiber cement article may be in a green or unhardened state, or it may be hardened to a predetermined degree or it may be fully cured. The polymeric coating 104 is preferably a powder coating applied to the substrate 102 as a powder and fluxed to form a continuous film over the surface 106 of the substrate 102. The powder coating can include but is not limited to coatings that have been disclosed in references such as U.S. Pat. Nos. 6,531,189; 6,706,794; 6,541,544, U.S. patent application No. 20030148039, which are all hereby incorporated by reference in their entirety. Preferably, the powder coatings can also be based on urethanes, epoxies, acrylics, polyesters and are applied to the fiber cement article 100. The powder coatings advantageously provide a decorative and durable finish.

As FIG. 1 shows, the composite article 100 further includes a surface interface 108 interposed between the substrate 102 and the powder coating 104. In one embodiment, the surface interface 108 comprises a portion of the substrate 102 that is configured with a predetermined surface porosity, which degree is determined by the type of powder coating chemistry used, the desired depth of coating penetration into the surface, the curing conditions and equipment for applying the coating, and the type of cementitious materials and/or fibers used in reinforcing the material. The desired surface porosity can be achieved in a number of ways including what is described below, either singly or in combination.

For example, in one implementation, the desired surface porosity may be achieved by using filled, loaded, sized and/or non-hollow fibers to alter the porosity of the substrate. In another implementation, the predetermined surface porosity can be achieved by altering the fiber cement surface with an inorganic filler, preferably a slurry or powder mixture comprising a cementitious material which will both fill voids and pores present in the surface as well as bond with the fiber cement material. Suitable cementitious materials include Type I or II cement, Portland cement, gypsum, calcium aluminate cement, sorel cement and the like. More preferably, the filler has self-leveling properties. In certain embodiments, fillers may be applied via a spattering apparatus, spray apparatus, roll coater, powder coater, or curtain coater and may be applied when the fiber cement material is fully hardened or in an uncured state. In other embodiments, the filler may be ironed, rolled or otherwise finished to provide a smooth surface prior to coating. In yet another embodiment, the predetermined surface porosity can be achieved via compressing, embossing, or debossing the green or uncured surface of the fiber cement article prior to curing.

In another embodiment, the surface interface 108 of the fiber cement article 100 can be a portion of the substrate having a predetermined moisture content on its surface to facilitate the powder coating process. The moisture content may be achieved by drying an overly moist surface or by wetting an overly dry surface. The required surface moisture content will vary depending upon the type and chemistry of the powder coating to be used and the surface porosity of the fiber cement material and the bulk moisture content of the fiber cement article. In certain embodiments, drying may be achieved by exposing the fiber cement surface to a stream of heated and/or dry air, by thermal radiation (infrared (IR) or near infrared (NIR)), microwave treatment, oven treatment, and the like. The surface may be wet by exposing the surface to humidified air, steam, liquid water sprays and the like.

In yet another embodiment, the surface interface 108 comprises a surface treatment interposed between the substrate surface 106 and the layer of powder coating 104. In this embodiment, the surface treatment 108 seals the surface so as to substantially reduce the degree of fiber swelling induced by subsequent application of the powder coating. Suitable surface treatments include, but are not limited to, polymer latexes or emulsions, particularly low viscosity latexes or emulsions, primers, fillcoats, tiecoats, sealers, moisture cure urethanes, powder coatings, silanes, silanols or siloxanes and the like. In one embodiment, the surface treatment is a sealer, curable thermally and/or by radiation, (such as U.V., NIR, electron beam, gamma radiation) or a by a combination thereof. In a preferred embodiment, the sealer is gel-cured or cured to a predetermined degree short of a full cure. More preferably, the sealer is gel cured using a UV or electron beam radiation means. Examples of radiation curable sealer chemistries and methods of applying radiation curable sealers are disclosed in U.S. Provisional Application No. 60/536,172, which is hereby incorporated by reference in its entirety.

The sealer may be applied to the fiber cement article 100 by using standard techniques known in the art, such as spraying, roll coating, curtain coating, powder coating or the like. Preferably, the sealer is embedded into the surface of the fiber cement article 100 by pressure or by drawing into the surface by vacuum. More preferably, the sealer is embedded into the surface of the fiber cement article 100 by passing it through a pressure nip roll or similar device under a predetermined amount of pressure. This has the additional advantage of laying down wayward fibers present on the surface of the fiber cement article 100 such that they are less likely to emerge when subsequent coatings are applied, thus avoiding a "hairy" appearance or fiber "raise" on the coated article and improving the durability and weatherability of the coating. The inventor has surprisingly found that passing fiber cement articles freshly coated or painted with about 100% organic coatings through a high pressure nip or press is very effective at reducing or eliminating fiber raise.

Figure 2:
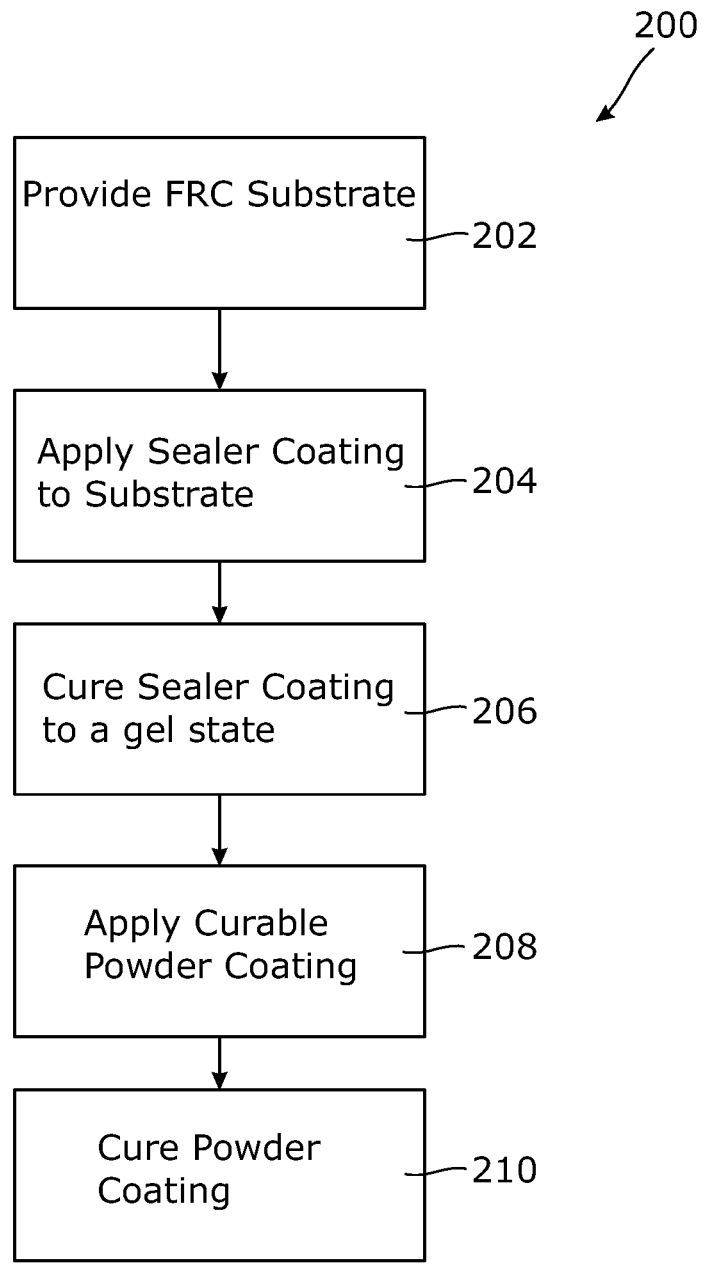
FIG. 2 is a flow diagram illustration a method of forming the composite cementitious building article of FIG. 1.

FIG. 2 is a flow diagram illustrating a process 200 for manufacturing a powder coated cementitious composite article of one preferred embodiment of the present invention. The process 200 begins with step 202 in which a fiber cement composite substrate is provided. The fiber cement composite substrate can be formed using known methods such as those described in PCT patent applications WO0228796. The process 200 continues with step 204 in which a surface treatment such as a sealer coating is applied to a surface of the fiber cement substrate using known methods. In step 206, the sealer is cured to a gel state by UV radiation or other known methods. The sealer will be subsequently fully cured concurrently with a subsequently applied powder coating to be described in greater detail below.

The process 200 further includes step 208 in which one or more layers of a curable powder coating is applied to a surface or subsurface of the cementitious composite substrate. In certain embodiments, the powder coating may be applied to the surface or the subsurface of a cured (hardened) fiber cement article or it may be applied to uncured fiber cement articles and cured either prior to or coincidentally with hardening the fiber cement article. In one embodiment, the powder coating is applied to the cementitious substrate using a number of solventless-type painting or coating systems through which a finely divided, heat fusible material is deposited on the substrate. The deposit is then fused into a continuous functional or decorative film on the substrate. Representative of these types of processes include flame spraying, fluidized bed, hot flocking, electrostatic spray (ESP) and electrostatic fluidized bed (ESFB). ESFB is a hybrid of fluidized bed and ESP. In a preferred embodiment, an ESP system is used. In another preferred embodiment, a tribocharged gun is used. Tribocharging offers well documented advantages over corona discharge in that tribo-guns require no high voltage supply, obtain better Faraday cage penetration, create less back ionization, achieve a wider range of minimum and especially maximum coating thicknesses, produce smoother and more continuous films, and achieve more consistent overall performance, especially in coating articles of complex configuration.

The triboelectric coating process of certain preferred embodiments of the present invention is particularly effective in situations such as when the substrate is profiled. The grooves and ridges present a particular problem for electrostatic coating processes because of the Faraday effect because the electrical charge generated by friction as the powder flows along the plastic or polymer coated surfaces inside the gun are typically relatively small in comparison with the charge picked up as the powder flows through a corona-discharge cloud. The grooves and sharp edges of such panels are covered very well on a flat line coating apparatus with nozzles arrayed to direct a portion of the powder against them. Such panels as well as flat-surfaced panels are particularly well coated by triboelectric guns on a flat line conveyor having electrically conductive bands around the circumference of the conveyor belt. Apparatus for such coating is disclosed in a series of patents assigned to the Nordson Corporation. These are U.S. Pat. Nos. 4,498,913; 4,590,884; 4,723,505; 4,871,380; 4,910,047; and 5,018,909, which are hereby incorporated by reference in their entirety.

As shown in FIG. 2, the process 200 continues with step 210 in which the powder coating is further processed to achieve a predetermined degree of cure. In certain embodiments, the powder coating may be cured thermally, by radiation, by NIR or by a combination thereof, either simultaneously or in staged sequences. In certain preferred embodiments, the powder coating and the gel-form sealer coating are co-cured at step 210.

FIG. 3 schematically illustrates a suitable flat powder coating apparatus 300 for applying powder coating to a cementitious article according to a preferred embodiment of the present invention. The apparatus 300 generally includes a conveyor 302 extending through a powder coating booth 304, wherein a fiber cement article 306 supported and moved by the conveyor belt 302 is coated triboelectrically by a plurality of guns 308 situated adjacent one another and in one or more tiers. In a preferred embodiment, the powder is forced into the guns 308 under about 40 psi pressure while air at about 20 psi is passed into the powder conduits just before the powder passes into the nozzles. The fiber cement article 306 bearing the powder is then conveyed through a curing oven 310 having several heating zones, some of which are heated by IR lamps, others by heat convection, and still others by a combination of those two. The coating and the curing line speeds may be the same or different, depending on the length of the curing oven. The line speed through the powder application booth 304 may be from about 5 to about 200 feet per minute but preferably from about 20 to about 100 feet per minute.

In some embodiments where conventional thermal curing methods are used to cure the powder, the line speed through the curing oven 310, may be from about 5 to about 50 feet per minute, depending on the oven temperature, the length of the oven, and the particular coating powder used. The curing temperature may range from about 120° F. up to the decomposition temperature of the powder. It is preferred to maintain the cure temperature within the range of from about 190° F. to about 350° F. and still more preferred to keep the cure temperature between about 250° F. to about 300° F.

More preferably, the powder coating may be cured using NIR radiation. Examples of NIR curing equipment and systems can be those manufactured by Adphos Advanced Photonics Systems AG and are described in U.S. Pat. No.6,436,485, WO03074193A2, EP1144129B1, DE10106888A1, WO0239039A1, WO0226897A2, DE20105063U1, and WO0124988A1, each of which are incorporated herein in their entirety as references. In a preferred embodiment, the NIR curing system co-cures the powder coating and the underlying sealer. The inventors have found that NIR curing is especially suited to curing powder coatings and indeed other typed of coatings such as water or solvent based coatings on cementitious composites. This is in large part because the NIR curing regime does not overheat or dehydrate the cementitious materials such as gypsum or Portland cement. Because NIR curing systems do not utilize combustion sources, they do not generate carbon dioxide and therefore will not carbonate the surface of a cement-containing composite The inventor has surprisingly found that the preferred embodiments of the present invention allow cementitious articles such as fiber cement articles, especially those articles with texture, profiles and sharp edges to be effectively and economically coated using powder coating techniques. Moreover, articles so coated are able to better maintain coating integrity and adhesion in various accelerated weathering tests such as EMMAQUA, QUV, ASTM C666, heat rain cycling, freeze thaw cycling and the like. Since the coatings are able to maintain adhesion for a longer period of time, the performance of the composite as a whole is also improved.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A cementitious composite article, comprising
a cementitious substrate having a first surface;
a powder coating layer including a plurality of a finely divided, heat fusible material; and
a surface interface comprising a separate sealer coating applied thereon, wherein the surface interface is interposed between the first surface and the powder coating layer, wherein the surface interface consists essentially of inorganic filler in the form of a slurry or powder mixture comprising a cementitious material for modifying the first surface porosity and facilities application of said powder coating layer to the substrate.

* * * * *